United States Patent
Ravindranath et al.

(10) Patent No.: US 10,785,652 B1
(45) Date of Patent: Sep. 22, 2020

(54) SECURE REMOTE ACCESS TO A 5G PRIVATE NETWORK THROUGH A PRIVATE NETWORK SLICE

(71) Applicant: Cisco Technology, Inc., San Jose, CA (US)

(72) Inventors: Rammohan Ravindranath, Bangalore (IN); Rajesh Indira Viswambharan, Bangalore (IN); Prashanth Patil, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/567,175

(22) Filed: Sep. 11, 2019

(51) Int. Cl.
| | |
|---|---|
| *H04L 29/06* | (2006.01) |
| *H04W 12/08* | (2009.01) |
| *H04L 12/911* | (2013.01) |
| *H04W 12/06* | (2009.01) |
| *H04W 28/02* | (2009.01) |

(52) U.S. Cl.
CPC ..... *H04W 12/0806* (2019.01); *H04L 63/0272* (2013.01); *H04L 63/0807* (2013.01); *H04L 63/0884* (2013.01); *H04W 12/0608* (2019.01); *H04W 12/0609* (2019.01); *H04W 12/0804* (2019.01)

(58) Field of Classification Search
CPC ......... H04W 12/0806; H04W 12/0804; H04W 12/0609; H04W 4163/0884; H04W 12/0272; H04W 12/0807
See application file for complete search history.

(56) References Cited

U.S. PATENT DOCUMENTS

| 9,648,141 B2 | 5/2017 | Reddy et al. |
| 2012/0226611 A1 | 9/2012 | Radia et al. |
| 2013/0007846 A1* | 1/2013 | Murakami ...... H04W 12/04031 726/4 |
| 2013/0086645 A1* | 4/2013 | Srinivasan ............. H04L 63/10 726/4 |
| 2017/0230829 A1* | 8/2017 | Lee ...................... H04L 63/083 |

(Continued)

FOREIGN PATENT DOCUMENTS

WO  2017200978 A1  11/2017

OTHER PUBLICATIONS

3GPP. TS 23.139 V15.0.0, Jun. 2018. (Year: 2018).*

(Continued)

*Primary Examiner* — Michael Simitoski
(74) *Attorney, Agent, or Firm* — Edell, Shapiro & Finnan, LLC

(57) ABSTRACT

In one illustrative example, a network node may receive, from a user equipment (UE), a message indicating a token authorization request for access to a custom, enterprise private network slice of a 5G network. The message may include a token provided to the UE by an enterprise server of an enterprise private network of the enterprise. The network node may perform a token validation procedure and, based on a successful token validation, send a message for causing a provisioning of one or more rules in a forwarding entity of the 5G network, for causing enterprise user plane (UP) traffic of the UE to be forwarded to an anchor UPF of the private network slice. The enterprise UP traffic communication may be used for the remote control and/or monitoring of elements in a private 5G network of the enterprise.

20 Claims, 15 Drawing Sheets

(56) References Cited

U.S. PATENT DOCUMENTS

| | | | | |
|---|---|---|---|---|
| 2017/0332212 | A1* | 11/2017 | Gage | H04W 4/70 |
| 2018/0192471 | A1* | 7/2018 | Li | H04W 72/0493 |
| 2018/0199279 | A1* | 7/2018 | Baek | H04W 48/06 |
| 2018/0205659 | A1* | 7/2018 | Ni | H04L 45/42 |
| 2018/0227302 | A1* | 8/2018 | Lee | H04L 63/102 |
| 2019/0044980 | A1* | 2/2019 | Russell | H04L 65/1016 |
| 2019/0053117 | A1* | 2/2019 | Bae | H04W 76/30 |
| 2019/0124508 | A1* | 4/2019 | Watfa | H04W 8/02 |
| 2019/0140919 | A1* | 5/2019 | Smith | H04L 67/10 |
| 2019/0149576 | A1 | 5/2019 | Rajadurai et al. | |
| 2019/0191309 | A1 | 6/2019 | Kweon et al. | |
| 2019/0223047 | A1 | 7/2019 | Gundavelli et al. | |
| 2019/0230681 | A1* | 7/2019 | Han | H04W 76/12 |
| 2019/0245789 | A1* | 8/2019 | Sabella | H04L 12/1407 |
| 2019/0251241 | A1* | 8/2019 | Bykampadi | H04L 63/0823 |
| 2019/0253407 | A1 | 8/2019 | Livanos et al. | |
| 2019/0253894 | A1 | 8/2019 | Bykampadi et al. | |
| 2019/0260641 | A1* | 8/2019 | Giust | H04L 41/0893 |

OTHER PUBLICATIONS

3GPP. TS 33.180 V16.0.0, Jun. 2019. (Year: 2019).*

3GPP. TS 38.300 V15.6.0, Jun. 2019. (Year: 2019).*

Corici, Andreea Ancuta, et al. "Enabling Dynamic IoT Security Domains: Cellular Core Network and Device Management Meet Authentication Framework." 2019 Global IoT Summit (GIoTS). IEEE, 2019. (Year: 2019).*

Ferdi, Samir, et al. "Dynamic Authorization for 5G Systems." 2018 IEEE Conference on Standards for Communications and Networking (CSCN). IEEE, 2018. (Year: 2018).*

Giust, Fabio, et al. "MEC deployments in 4G and evolution towards 5G." ETSI White Paper 24 (2018): 1-24. (Year: 2018).*

GSM Association. "Network Slicing Use Case Requirements." (2018). (Year: 2018).*

Hardt, Dick, and Michael Jones. "The oauth 2.0 authorization framework: Bearer token usage." (2012). (Year: 2012).*

Hardt, Dick, and Michael Jones. "The oauth 2.0 authorization framework" (2012). (Year: 2012).*

Kekki, Sami, et al. "MEC in 5G networks." ETSI white paper 28 (2018): 1-28. (Year: 2018).*

Rudolph, Hans Christian, et al. "Security Challenges of the 3GPP 5G Service Based Architecture." IEEE Communications Standards Magazine 3.1 (2019): 60-65. (Year: 2019).*

Sakimura, Nat, et al. "OpenID Connect Core 1.0 incorporating errata set 1." The OpenID Foundation, specification (2014). (Year: 2014).*

ETSI, "5G; 5G System; Network Slice Selection Services; Stage 3 (3GPP TS 29.531 version 15.1.0 Release 15)", ETSI TS 129 531 V15.1.0, Oct. 2018, 44 pages.

5G Americas, "The Evolution of Security in 5G", Jul. 2019, 61 pages.

Zhou, Xuan et al., "Network Slicing as a Service: Enabling Enterprises' Own Software-Defined Cellular Networks", IEEE Communications Magazine, Jul. 2016, 9 pages.

Huang, Shih-Chun et al., "Application-Aware Traffic Redirection: A Mobile Edge Computing Implementation Toward Future 5G Networks", 2017 IEEE 7th International Symposium on Cloud and Service Computing (SC2), https://ieeexplore.ieee.org/document/8315351, Nov. 22-25, 2017, 2 pages.

Reznik, Alex et al., "MEC in an Enterprise Setting: A Solution Outline", ETSI White Paper No. 30, Sep. 2018, 20 pages.

Toosi, Adel Nadjaran et al., "Management and Orchestration of Network Slices in 5G, Fog, Edge and Clouds", https://arxiv.org/pdf/1812.00593, downloaded Sep. 4, 2019, 31 pages.

Jim Hodges et al., "5G Security Strategy Considerations", Juniper Networks, Heavy Reading Reports, Apr. 2019, 9 pages.

Oracle, "Network Slice Selection Function (NSSF) Cloud Native User's Guide", Oracle, Release 1.0, Apr. 2019.

3GPP, "TS 23.501: Slice co-existence and conflicting S-NSSAIs", Qualcomm Incorporated, LG Electronics, May 15-19, 2017, 8 pages.

Tony Saboorian et al., "Network Slicing and 3GPP Service and Systems Aspects (SA) Standard", IEEE Softwarization, Dec. 2017, 8 pages, retrieved from Internet May 12, 2020; https://sdn.ieee.org/newsletter/december-2017/network-slicing-and-3gpp-service-and-systems-aspects-sa-standard.

Huawei, "Partnering with the Industry for 5G Security Assurance", Huawei, 2019, 22 pages.

Nokia Networks, "Cloud Mobile Gateway", Nokia Networks, 4 pages, retrieved from Internet May 12, 2020; https://www.nokia.com/networks/products/cloud-mobile-gateway/#overview.

ZTE, "5G Security White Paper", ZTE, May 2019, 14 pages.

Samsung, "5G Core Vision", Samsung 5G Core vol. 1, 2019, 16 pages.

* cited by examiner

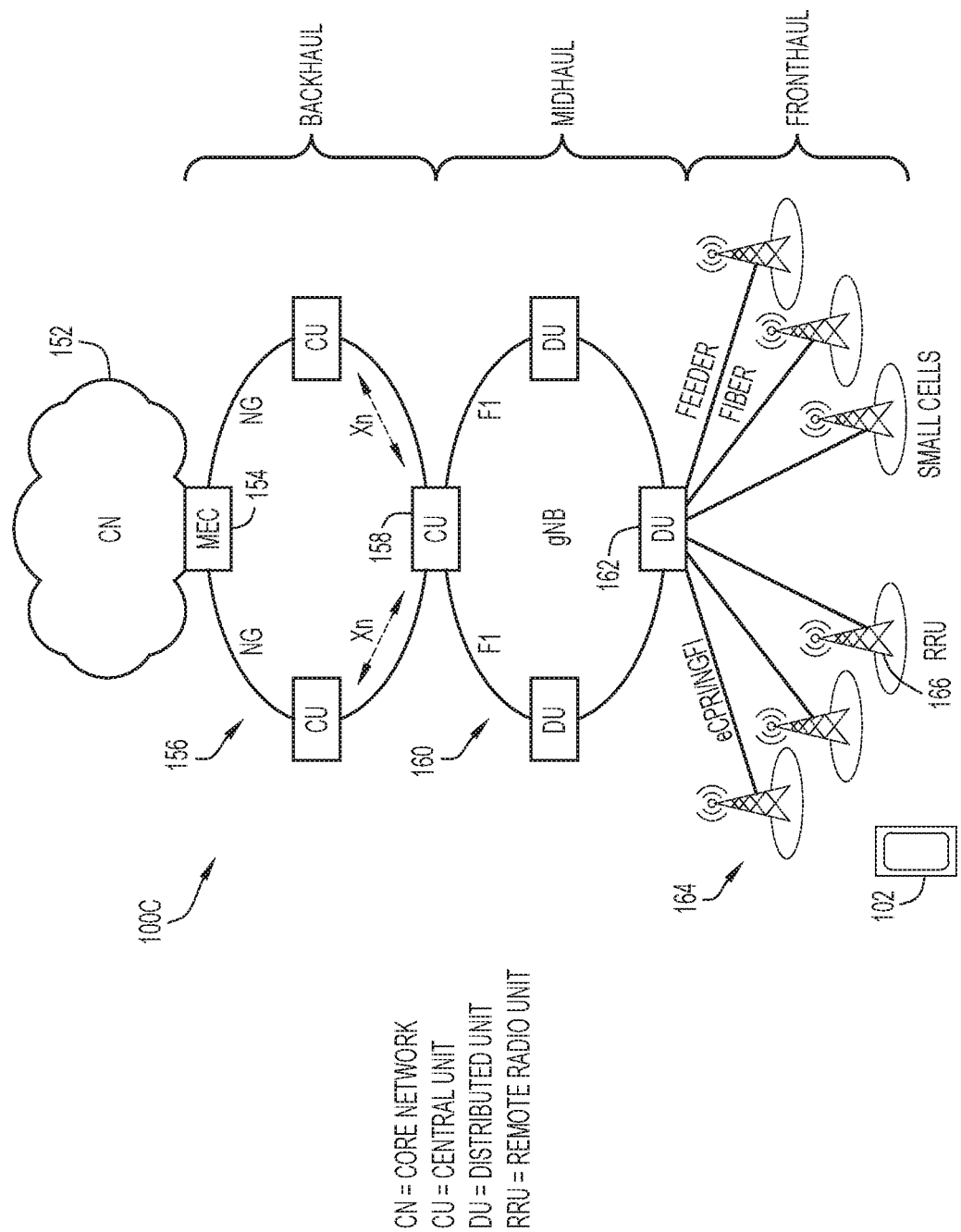

US 10,785,652 B1

SECURE REMOTE ACCESS TO A 5G PRIVATE NETWORK THROUGH A PRIVATE NETWORK SLICE

TECHNICAL FIELD

The present disclosure relates generally to communications in mobile networks, and more particularly to techniques and mechanisms for providing a secure remote access to a private 5G network of an enterprise through a custom enterprise private network slice of a 5G network, which may be facilitated by a Multi-access Edge Computing (MEC) or other suitable service.

BACKGROUND

An emerging use case for Fifth Generation (5G) networks is "private 5G." In private 5G, an enterprise private 5G network may be deployed inside the premises of an enterprise. One of the motivations behind private 5G is the support industrial Internet of Things (IoT), where the enterprise has the ability to operate its own network (e.g. in a factory, processing plant, airport, mining facility, etc.).

Some of these deployments may require human communications as well. For example, an enterprise may wish to replace Terrestrial Trunked Radio (TETRA) radio walkie-talkie units with more sophisticated cellular smartphone devices, or links to Unified Communications as a Service (UCaaS) systems. Further, in-house 5G provisioning may allow an enterprise to provide its own security implementations, in lieu of trusting the security provided by a Mobile Network Operator (MNO). This would allow sensitive, proprietary data to stay local, and therefore, more safe.

In such environments, members of an enterprise may have a need to regularly or continuously monitor aspects and conditions of systems in the enterprise private 5G network. For example, conditions or alarms in a factory or manufacturing plant may need to be monitored remotely.

Accordingly, there is a need for users to remotely manage systems of an enterprise private 5G network, where the remote access is safe and secure.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1C is an illustrative representation of a Next Generation (NG) Radio Access Network (RAN) (NG-RAN) architecture for the 5G network of FIGS. 1A and 1B;

DESCRIPTION OF EXAMPLE EMBODIMENTS

Figure 1A:
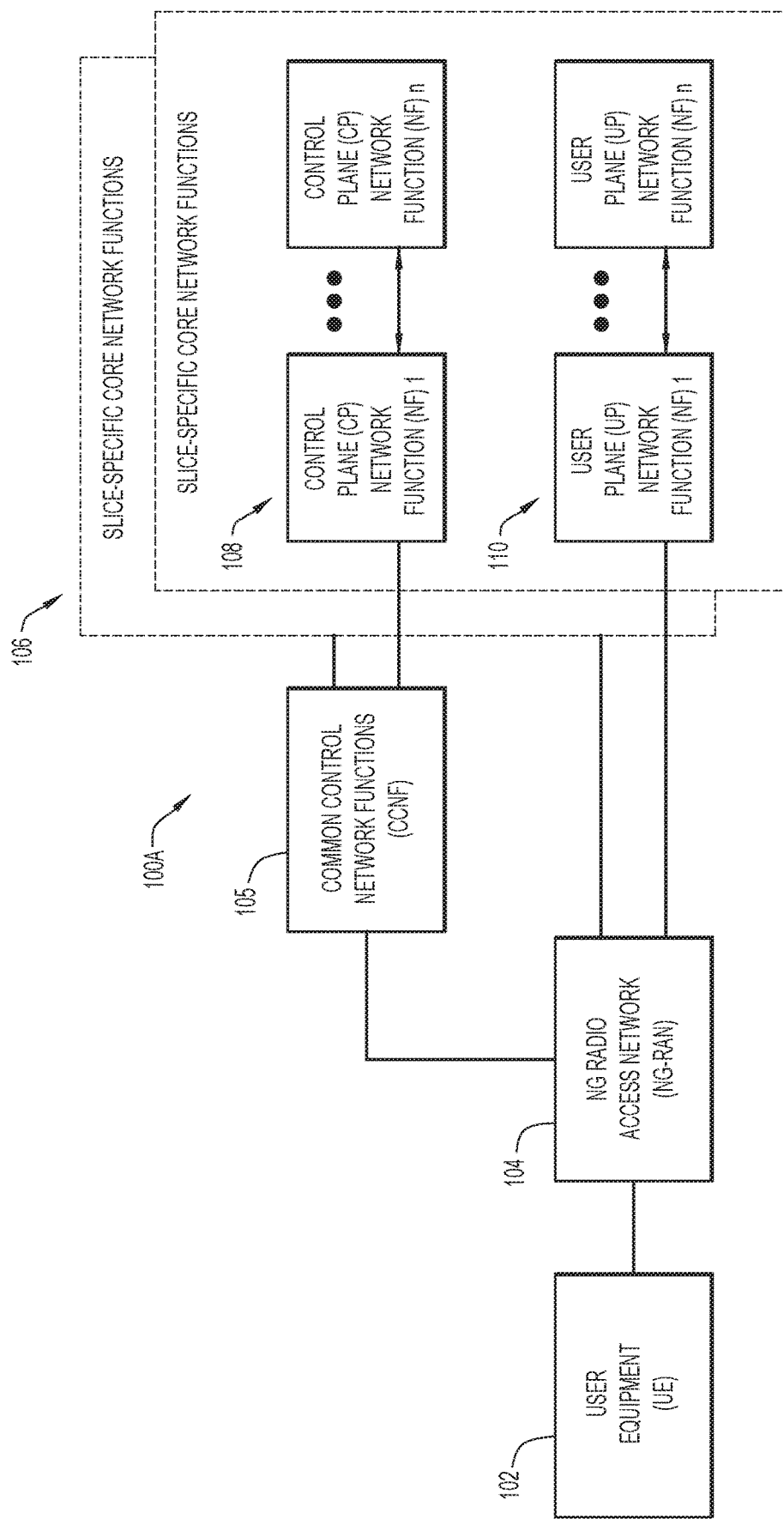
FIG. 1A is an illustrative representation of a general network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

What are described are techniques and associated mechanisms to facilitate a secure remote access by a user equipment (UE) to an enterprise private Fifth Generation (5G) network of an enterprise, through a custom enterprise private network slice of a public 5G network. Such techniques and mechanisms may be facilitated by a Multi-access Edge Computing (MEC) service or other suitable service in the 5G network.

In general, traffic splitting functionality may be used in order to route enterprise user plane (UP) traffic from the UE using the private network slice while routing remaining subscriber UP traffic from the same UE using a subscriber network slice of the subscriber. Such a mechanism may be considered or viewed as a Split Virtual Private Network (VPN), where enterprise UP traffic is routed through a secure tunnel to the enterprise while remaining subscriber UP traffic is routed to the Internet or other public network.

In one illustrative example of the present disclosure, a network node may receive, from a UE, a message indicating a token authorization request for access to a custom, enterprise private network slice in a 5G network. The message may include a token provided to the UE by an enterprise (e.g. authentication) server of an enterprise private network of an enterprise (e.g. the enterprise that requested and/or participated in the creation of the private network slice). The network node may perform a token validation procedure in response to the token authorization request. Based on a successful token validation, the network node may send a message for causing a provisioning of one or more rules in a forwarding entity, for causing enterprise UP traffic of the UE to be forwarded to an anchor UPF of the private network slice. The enterprise UP traffic communication may be used for remote control and/or monitoring of elements in a private 5G network of the enterprise.

More detailed and alternative techniques and implementations are provided herein as described below.

Example Embodiments

What are provided herein are techniques and mechanisms for providing a user equipment (UE) with secure access to a custom enterprise private network slice of a Fifth Generation (5G) network for communications, which is suitable for a secure remote access to a private 5G network of an enterprise.

To better explain in relation to the figures, FIG. 1A is an illustrative representation of a general network architecture 100A of a 5G network. Network architecture 100A includes common control network functions (CCNF) 105 and a plurality of slice-specific core network functions 106. With network architecture 100A, the 5G network may be configured to facilitate communications for a user equipment (UE) 102. UE 102 may obtain access to the 5G network via a radio access network (RAN) or a Next Generation (NG) RAN (NG-RAN) 104. UE 102 may be any suitable type of device, such as a cellular telephone, a smart phone, a tablet device, an Internet of Things (IoT) device, a machine-to-machine (M2M) device, and a sensor, to name but a few.

Notably, the 5G network includes a Service-Based Architecture (SBA) which may provide a modular framework from which common applications can be deployed using components of varying sources and suppliers. The SBA of the 5G network may be configured such that control plane functionality and common data repositories are provided by way of a set of interconnected Network Functions (NFs), each with authorization to access each other's services. Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of functionalities provided by CCNF 105.

On the other hand, slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
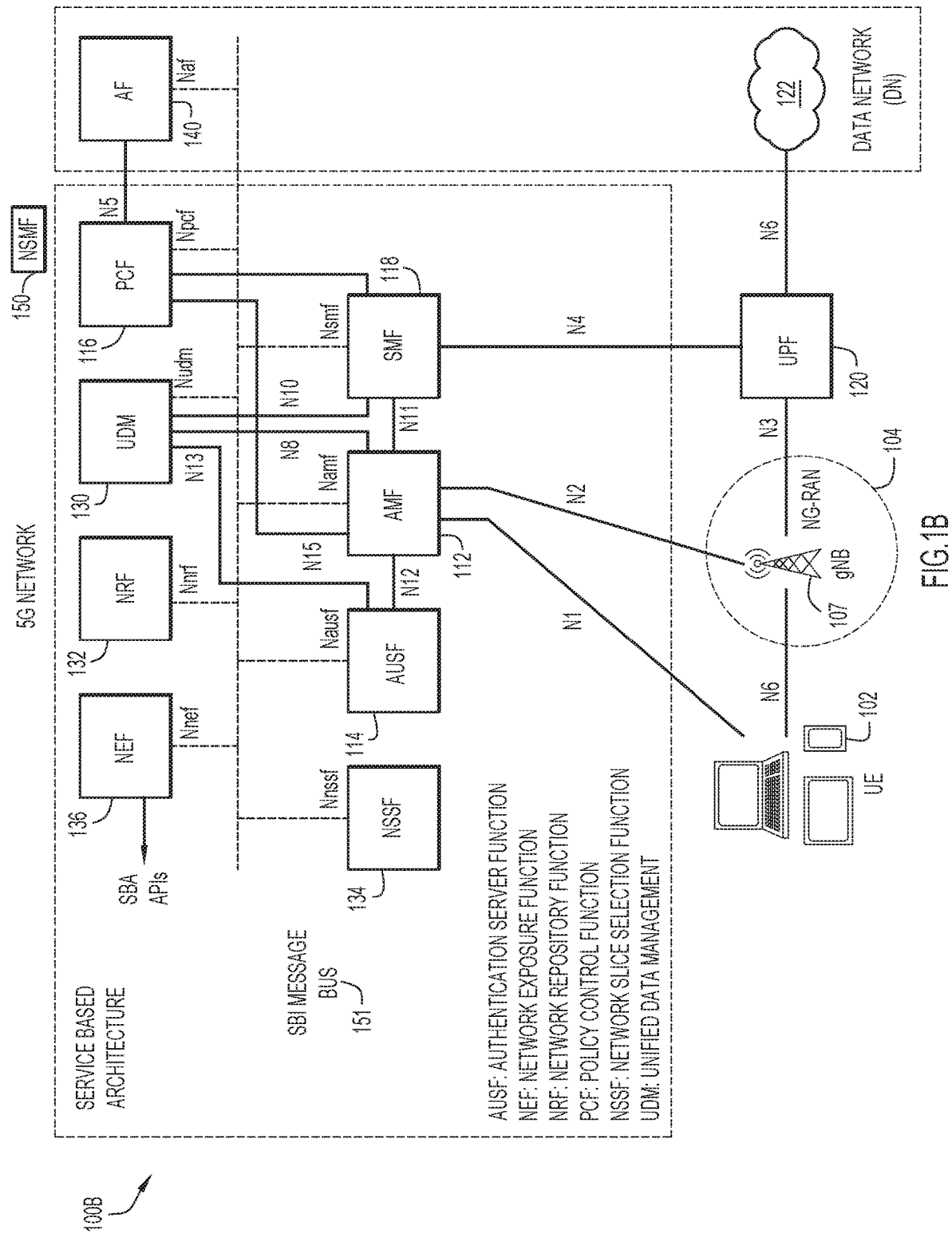
FIG. 1B is an illustrative representation of a more detailed network architecture of the 5G network of FIG. 1A.

FIG. 1B is an illustrative representation of a more detailed network architecture 100B of the 5G network of FIG. 1A. As provided in the Third Generation Partnership Project (3GPP) standards for 5G (e.g. 3GPP Technical Specifications or "TS" 23.501 and 23.502), network architecture 100B for the 5G network may include an AMF 112, an authentication server function (AUSF) 114, a policy control function (PCF) 116, an SMF 118, and a UPF 120 which may connect to a data network (DN) 122. Other NFs in the 5G network include an NSSF 134, a network exposure function (NEF) 136, a network function (NF) repository function (NRF) 132, and a Unified Data Management (UDM) function 130. A plurality of interfaces and/or reference points N1-N8, N10-N13, and N15 shown in FIG. 1B (as well as others) may define the communications and/or protocols between each of the entities, as described in the relevant (evolving) standards documents.

In FIG. 1B, UPF 120 is part of the user plane and all other NFs (i.e. AMF 112, AUSF 114, PCF 116, SMF 118, and UDM 130) are part of the control plane. One or more Packet Data Unit (PDU) sessions may be established for UP traffic associated with UE 102 which communicates via a base station such as a gNodeB (gNB) 107 of NG-RAN 104. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling.

The SBA of the 5G network is better illustrated in FIG. 1B, again where control plane functionality and common data repositories may be provided by the set of interconnected NFs, each with authorization to access each other's services. With the SBA, each NF service may expose its functionality through a Service Based Interface (SBI) message bus 151. SBI message bus 151 may employ a Representational State Transfer (REST) interface (e.g. using Hypertext Transfer Protocol or "HTTP"/2). As indicated in FIG. 1B, the SBI interfaces of SBI message bus 151 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140. Assuming the role of either service consumer or service producer, these NFs may be self-contained, independent and reusable.

Network slicing brings a high degree of deployment flexibility and efficient resource utilization when deploying diverse network services and applications. A network slice management function (NSMF) 150 may be configured to manage and orchestrate a network slice instance (NSI) of a network slice. NSMF 150 may perform a number of related functions, such as derive network slice subnet related requirement from network slice related requirements. NSSF 134 may facilitate the use of network slices in the 5G network, as it operates to select NSIs for UEs. A logical, end-to-end network slice may have predetermined capabilities, traffic characteristics, and service level agreements (SLAs), and may include the virtualized resources required to service the needs of a Mobile Virtual Network Operator (MVNO) or group of subscribers, including a dedicated UPF 120, SMF 118, and PCF 116.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context.

One or more application functions, such as an application function (AF) 140 may connect to the 5G network, for example, via PCF 116. AF 140 may interact with the network via NEF 136 in order to access network capabilities. NEF 136 may securely expose network capabilities and events provided by NFs to AF 140, and may provide a means for AF 140 to securely provide information to the 5G network.

In general, NRF 132 may maintain NF profiles of available NF instances and their associated services, and support a service discovery function for service discovery associated with the NF profiles. NF profiles of NF instances maintained in NRF 132 may include NF instance ID, NF type, network slice identifiers such as NSI ID, NF capacity information, names of supported services, etc. For service discovery, NRF 132 may receive a discovery request from an NF instance and provide information associated with the discovered NF instance to the NF instance in response.

In traditional 3G networks, both baseband and RF processing functions were provided in an "all-in-one" base station and distributed at each cell site. After RF processing, mobile signals were fed to antennas via coaxial cables due to the short distance between the base station and antenna. For 4G networks, a centralized RAN (C-RAN) architecture was proposed to separate the baseband processing function from the base station, consolidating the baseband processing function for many radio units into a centralized pool of baseband units (BBUs). Since the fiber distance between the BBU and the radio units may be extended to tens of kilometers, mobile signals were transmitted over digital fiber links via a Common Protocol Radio Interface (CPRI) interface (i.e. a standard for transporting baseband in-phase and quadrature or "I/Q" signals to a radio unit of the base station).

For 5G networks, the 3GPP proposes a Next Generation (NG) RAN architecture with an additional functional split. To illustrate, FIG. 1C is an illustrative representation of an NG-RAN architecture 100C for a 5G network (e.g. the 5G network of FIG. 1B, NG-RAN 104). In NG-RAN architecture 100C, baseband processing originally in the BBUs of a C-RAN are now distributed into central units (CUs) 156 (such as CU 158) and distributed units (DUs) 160 (such as a DU 162). Each one of DUs 160 may interface with one or more remote radio units (RRUs) 164 (such as an RRU 166). An RRU may also be known as a remote radio head (RRH); an RRU may include or be combined with a remote interface unit (RIU). CUs 156 may communicate with a core network 152 via a multi-access edge computing (MEC) system or node 154. In some implementations, a cluster of RRUs may be associated with or aggregated into a single DU. In turn, multiple DUs may be associated with or aggregated into a single CU. As is apparent, such an architecture may allow an operator to scale the network as the number of cells, frequencies, and user capacity increases.

In some implementations, the software which typically implements network functions may be decomposed from the hardware. When the software is decomposed from the hardware, a multi-vendor approach may be better facilitated for the benefit of a mobile service provider. For example, CU functions of a cloud RAN deployment may be instantiated on a common server platform (e.g. a mass-produced, Intel x86 server). In some implementations, the functions may be virtualized on a (carrier-grade) Network Functions Virtualization (NFV) software framework or platform. DU functions may also be virtualized on a similar NFV platform depending on availability of the type of transport, or alternatively may be implemented as a network function on a common server platform (e.g. near the cell site). Thus, CU and DU functions may be virtualized. Scaling may entail instantiating one or more additional virtualized CU (vCUs) and/or virtualized DU (vDU) functions as Virtual Network Functions (VNFs) on an NFV platform. In alternative approaches, scaling may entail increasing the processing capability of an existing VNF. Such virtualization may facilitate an open and virtualized RAN (vRAN).

The MEC node 154 of FIG. 1C may include a service for secure access to a private network slice in the 5G network, for a secure remote access to a private 5G network of an enterprise. Information regarding MEC in 5G networks is available in references including "MEC in 5G networks," Kekki et al., ETSI White Paper No. 28, First edition, July 2018. MEC may be understood to be a cloud-based service environment provided at the "edge" of the network, bringing real-time, high-bandwidth, low-latency access to information. MEC may reduce network congestion and improve application performance by performing task processes closer to the user. MEC aims to improve the delivery of content and applications to users. MEC use cases realized today include connected car, which also thrives in high-bandwidth, low-latency, highly-available settings; and Internet of Things (IoT) applications that rely on high performance and smart utilization of network resources.

Figure 2:
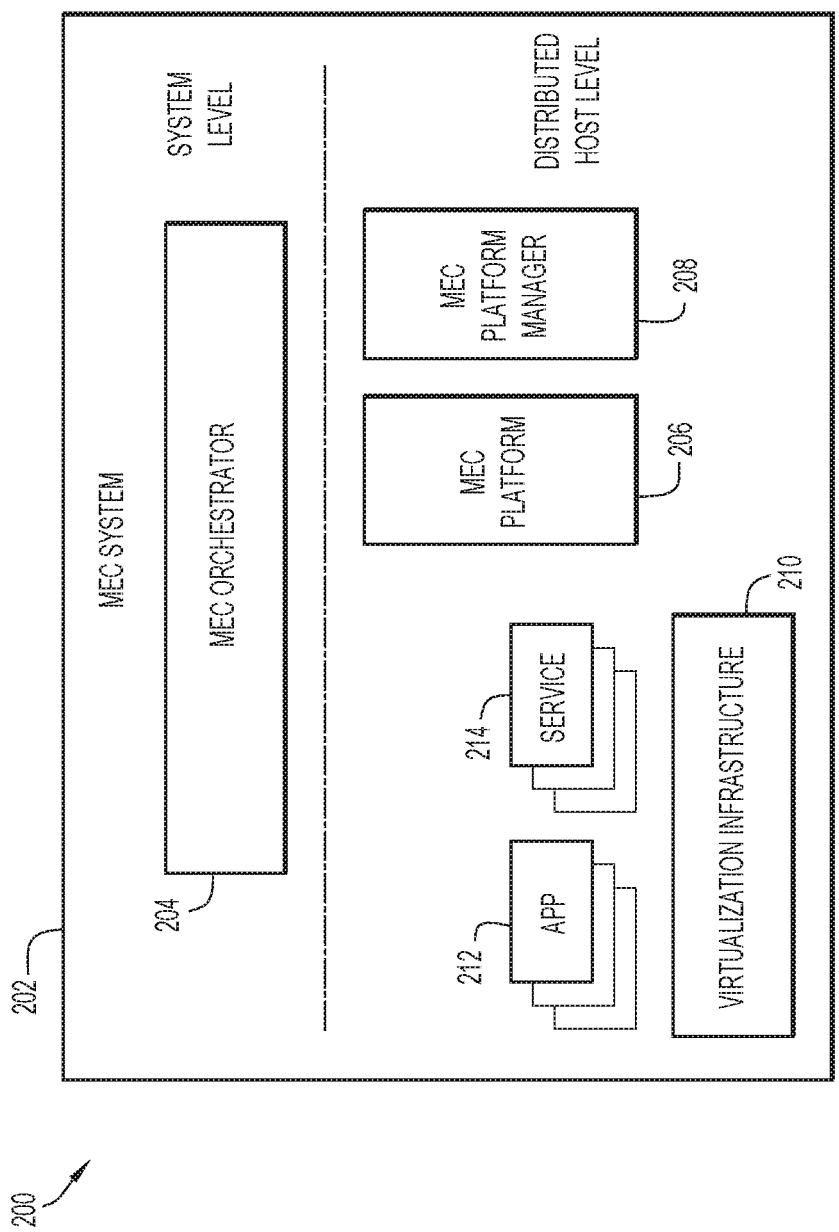
FIG. 2 is an illustrative representation of a generic Multi-access Edge Computing (MEC) system architecture for use in the 5G network of FIGS. 1A-1C.

FIG. 2 is an illustrative representation of a MEC system architecture 200 of an MEC system 202 for use in a 5G network (e.g. the mobile network of FIGS. 1A-1C). MEC system architecture 200 may include, at the system level, an MEC orchestrator 204 and, at the distributed host level, an MEC platform 206, an MEC platform manager 208, a virtualization infrastructure 210, a plurality of applications 212, and a plurality of services 214.

MEC system architecture 200 of the MEC system 202 of FIG. 2 may be provided in the 5G network environment of FIGS. 1A-1C, where some of the functional entities of the MEC interact with NFs of the 5G core network. Discussion of 5G entities (e.g. FIGS. 1A-1C) in relation to MEC entities will now follow.

NFs and associated services produced in the 5G network may be registered with an NRF (e.g. NRF 132 of FIG. 1B), while services produced by applications may be registered in a service registry of MEC platform 206. Service registration may be considered part of an application enablement functionality. To use a service, a network function may directly interact with an NF that produces the service. A list of available services may be discovered from the NRF. Some of the services may be accessible via the NEF (e.g. NEF 136 of FIG. 1B) for accessing the service, and these services may also be available to untrusted entities that are external to the domain. The NEF may serve as a centralized point for service exposure and have a role in authorizing access requests originating from outside of the system.

As described earlier, one of the key concepts in 5G is network slicing. Network slicing allows the allocation of the required features and resources from the available network functions to different services or to tenants that are using the services. As described previously, an NSSF (e.g. NSSF 134 of FIG. 1B) is a function that assists in the selection of suitable network slice instances for users, as well as the allocation of an AMF (e.g. AMF 112 of FIG. 1B). An MEC application (i.e. an application hosted in a distributed cloud of an MEC system) may belong to one or more network slices that have been configured in the 5G core network.

Policies and rules in the 5G system may be handled by the PCF (e.g. PCF 116 of FIG. 1B). The PCF is also the function that may service an AF (e.g. an MEC platform). The PCF may be accessed either directly or indirectly via the NEF (e.g. NEF 136 of FIG. 1B), depending whether the AF is considered trusted or not. In the case of traffic steering, it may depend on whether the corresponding PDU session is known at the time of the request.

The UPF (e.g. UPF 120 of FIG. 1B) may have a significant role in an integrated MEC deployment in a 5G network. UPFs may be considered a distributed and configurable data plane from the MEC system perspective. In some implementations, a local UPF may be part of the MEC implementation.

Figure 3:
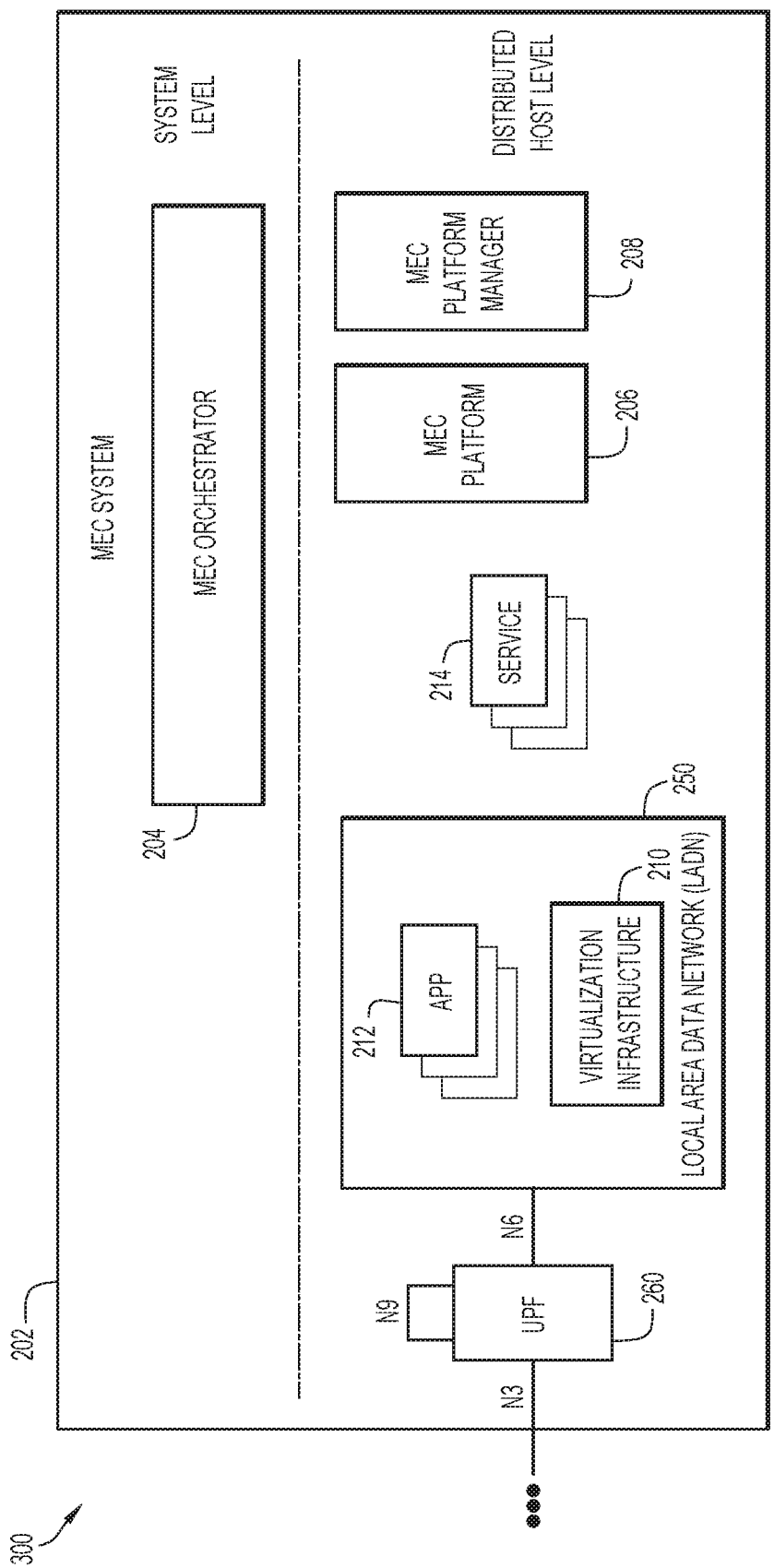
FIG. 3 is an illustrative representation of an MEC system architecture of an integrated MEC deployment in the 5G network of FIGS. 1A-1C.

To better illustrate, FIG. 3 shows how MEC system 202 of FIG. 2 may be deployed in an integrated manner in a 5G network. More specifically, what is shown in FIG. 3 is an illustrative representation of an MEC system architecture 300 of an integrated MEC deployment with a 5G network (e.g. the mobile network of FIGS. 1A-1C). In some implementations, MEC system 202 may be deployed on the N6 reference point of a UPF 260, e.g. in a data network 250 (e.g. a local area data network or "LADN") external to the 5G system. This is enabled by the flexibility in locating a UPF. MEC orchestrator 204 may be configured to serve as an AF in the 5G network and interact with an NEF (e.g. NEF 136 of FIG. 1B). In some implementations, MEC orchestrator 204 may directly interact with target NFs. On the MEC host level, MEC platform 206 may be configured to interact with 5G NFs, again in the role of an AF. The MEC host (i.e. host level functional entities) may be deployed in a data network of the 5G network. While the NEF as a core network function is a system level entity deployed centrally together with similar NFs, an instance of an NEF may also be deployed at the edge to allow low latency, high throughput service access from an MEC host.

The SMF (e.g. SMF 118 of FIG. 1B) may be configured to perform session management, IP address allocation and management, Dynamic Host Control Protocol (DHCP) services, selection/re-selection and control of the UPF, configuring traffic rules for the UPF, lawful intercept (LI) for session management events, charging, and support for roaming. As MEC services may be offered in both centralized and edge clouds, for example, the SMF may play a significant role due to its role in selecting and controlling the UPF. The SMF may expose service operations to allow the MEC to serve as a 5G AF to manage PDU sessions, control policy settings and traffic rules, and subscribe to notifications on session management events.

Logically, MEC hosts may be deployed in the edge or a central data network. The UPF (e.g. UPF 120 of FIG. 1B) may handle the steering of UP traffic towards targeted MEC applications. The locations of the UPF and data networks may be based on the choice of the network operator. The network operator may choose to place the physical computing resources in accordance with technical and business parameters, such as available site facilities, supported applications and their requirements, measured or estimated user load etc. In some implementations, the MEC management system that orchestrates the operation of MEC hosts and applications may be configured to determine dynamically where to deploy the MEC applications.

Figure 4:
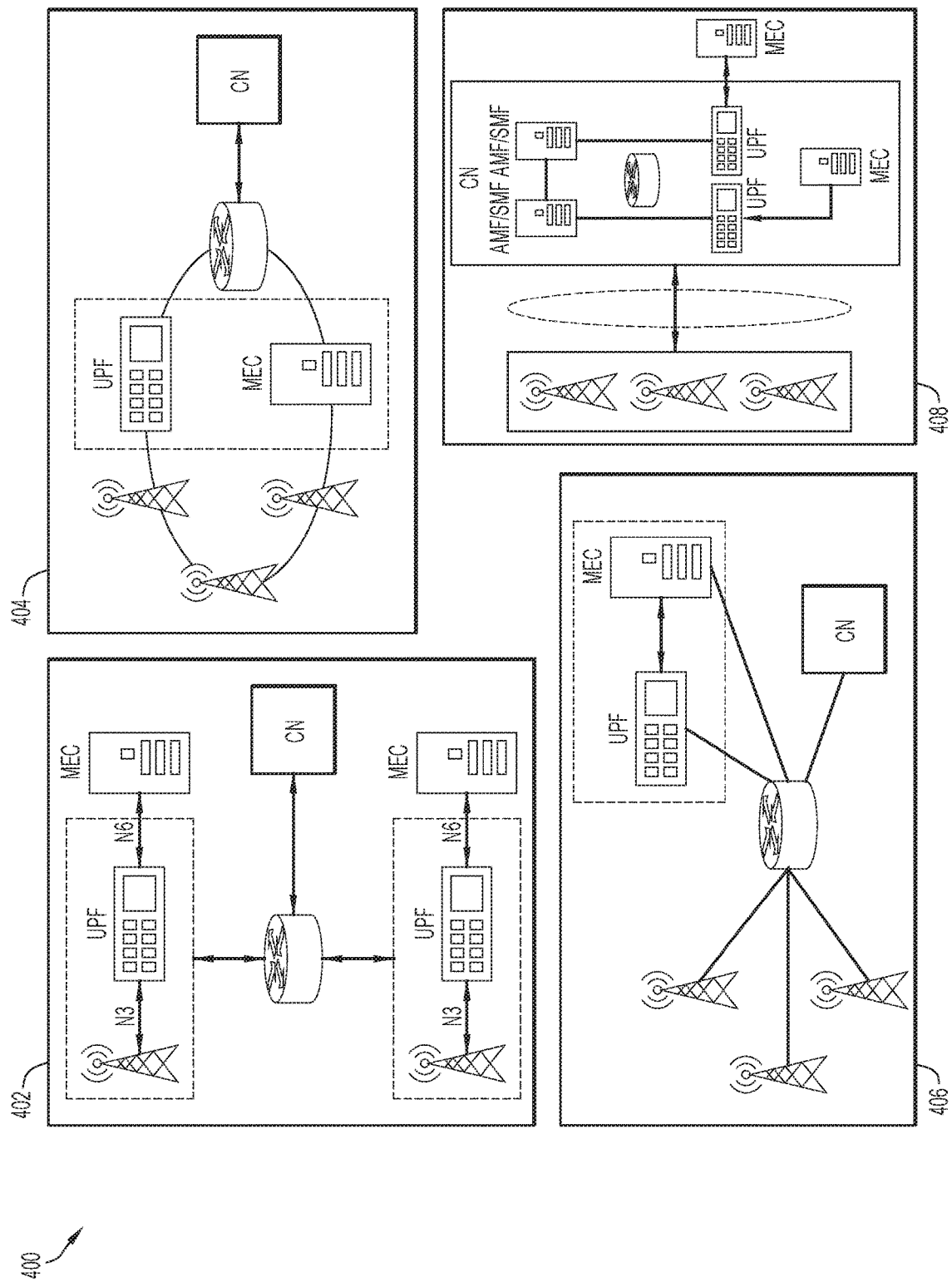
FIG. 4 is an illustrative representation of network architecture arrangements which represent options for a physical location of the MEC and associated applications.

As described previously, an MEC system or node may include a service for secure access to a private network slice in the 5G network, for a secure remote access to a private 5G network of an enterprise. There may be various options for the physical deployment of MEC hosts that may be made available, and these options may be based on various operational, performance and/or security related requirements. To better illustrate, FIG. 4 is an illustrative representation of a plurality of different network architecture arrangements 400 representing options for a physical location of the MEC and associated applications. In particular, as illustrated in a network architecture arrangement 402 of FIG. 4, the MEC and local UPF may be collocated with a base station. As illustrated in a network architecture arrangement 404 of FIG. 4, the MEC may be collocated with a transmission node, possibly with a local UPF. As illustrated in a network architecture arrangement 406 of FIG. 4, the MEC and a local UPF may be collocated with a network aggregation point. As illustrated in a network architecture arrangement 408, the MEC may be collocated (e.g. in the same data center) with CN functions (e.g. AMF, SMF, etc.). Other network architectures may be realized as one skilled in the art would readily appreciate. As is apparent, the physical deployment options indicate that the MEC may be flexibly deployed in different locations, from near the base station to closer to the central data network. In many such deployments, a UPF may be deployed and used to steer the traffic towards targeted MEC applications and towards the network.

Figure 5:
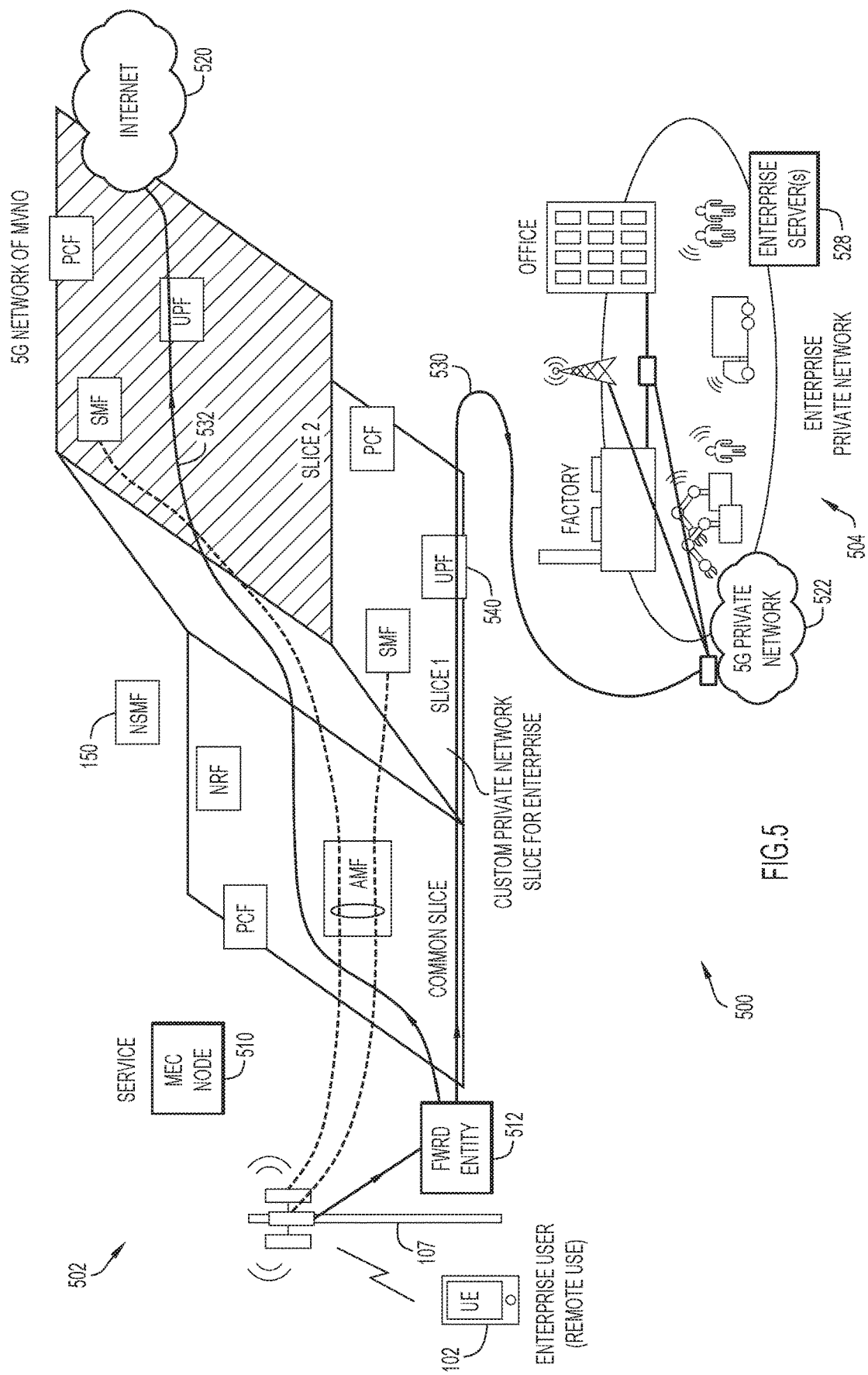
FIG. 5 is an illustrative representation of a system which includes a 5G network of a Mobile Virtual Network Operator (MVNO) and a private 5G network of an enterprise, illustrating a user equipment (UE) that operates in the 5G network remotely for a secure access to a private network slice of the 5G network for communications, suitable for a secure remote access to the private 5G network of the enterprise.

FIG. 5 is an illustrative representation of a system 500 which includes a (e.g. public) 5G network 502 of a MVNO and an enterprise private network 504 which includes a private 5G network 522 of an enterprise. The 5G network 502 of FIG. 5 may generally have the same architecture and functions as the 5G network shown and described in relation to FIGS. 1A-1C and may involve MEC systems shown and described in relation to FIGS. 2-4. The enterprise may generally provide enterprise private network 504 for communications in one or more office locations of the enterprise. The enterprise private network 504 may include one or more enterprise servers 528 (e.g. application servers, authentication servers, etc.). In the present example, private 5G network 522 of the enterprise may be provided in a factory or plant of the enterprise.

UE 102 of FIG. 5 operates in the 5G network 502 of the MVNO (e.g. via gNB 107 or the like). Operating remotely, UE 102 may wish to use a private network slice ("Slice 1") of the 5G network 502 for communications. The private network slice may include at least a UPF, an SMF, and a PCF. Using the private network slice, UE 102 may access the private 5G network 522 of the enterprise. For example, the communications of UE 102 may be used for the remote control and/or monitoring of elements of the factory via the private 5G network 522.

An MEC node 510 in the 5G network 502 may provide a service for access to the private network slice of the 5G network 502 for communications. When the service of the MEC allows UE 102 access to the private network slice, a forwarding entity 512 in the MEC may operate to "split" or forward UP traffic of UE 102, such that enterprise UP traffic of UE 102 may be communicated using the private network slice (e.g. "Slice 1") but subscriber UP traffic may be communicated using a subscriber network slice (e.g. "Slice 2").

Forwarding entity 512, which may be located in the MEC, may be or include a router, a gateway, a classifier, a branching point, a Branching Point UPF, or an Uplink (UL) Classifier (UL-CL), or any combination of the above. As illustrated in FIG. 5, the enterprise UP traffic of UE 102 may be forwarded and routed toward and to an anchor UPF 540 in "Slice 1" along a path 530 to the private 5G network 522 of the factory, whereas the subscriber UP traffic of UE 102 may be forwarded and routed in "Slice 2" along a path 532 to an Internet 520 or other network.

At least in some implementations, the techniques and mechanisms of the present disclosure may utilize an authorization protocol or framework for secure access. The authorization protocol or framework may alternatively be referred to as a delegation protocol or framework.

In preferred implementations, the authorization protocol is OAuth 2.0. OAuth 2.0 may be considered an open standard for token-based authentication and authorization, which generally involves a client, an authorization server, and a resource server. In OAuth 2.0, "claims" and "scopes" may be utilized; in general, scopes may be identifiers used to specify what access privileges are being requested, whereas claims may be name/value pairs that contain information about a user. The OAuth 2.0 Authorization Framework which may be utilized is described in "*The OAuth 2.0 Authorization Framework*," Internet Engineering Task Force (IETF), Request for Comments (RFC) 6749, D. Hardt, October 2012. See also e.g. RFC 7636. In some implementations as described further herein, the present techniques may include or be based on an OAuth Authorization Code flow; in other implementations, the present techniques may include or be based on an implicit flow. Although the terminology "OAuth 2.0" is used throughout the present disclosure, the terminology is intended to cover subsequently-derived and/or compatible versions or variations of OAuth 2.0. Also, any suitable protocol other than OAuth 2.0 having similar features may be utilized as an alternative.

In the present case, with reference to FIG. 5, MEC node 510 or its service for access to the private network slice for communications may be considered to be the client (e.g. OAuthClient) of the enterprise; enterprise server 528 of the enterprise may be considered to be the authorization server (e.g. authorization endpoint); and the function of the 5G network (e.g. the NF or NSMF 150) which allows access to the private network slice may be considered to be the resource server. The function of the 5G network (e.g. the NF or NSMF 150) may serve as a token endpoint, operative in connection with the enterprise server 528 which may serve as an authorization endpoint.

In some implementations, UE 102 may operate remotely in a home network at a user's residence, for example, in a fixed broadband access network. Here, functionalities and procedures for fixed broadband access network-mobile network integration for integrating fixed broadband access networks and mobile networks may be utilized. Here, a Broadband Network Gateway (BNG) or Broadband Remote Access Server (BRAS) may connect to an enhanced Packet Data Gateway (ePDG) which connects to a Branching Point UPF; this Branching Point UPF may be provisioned to forward and route the enterprise UP traffic toward and to the anchor UPF in the private network slice. Such integration and interworking are defined by 3GPP, for example, in 3GPP Technical Specification (TS) 23.139, Technical Specification Group Services and System Aspects; 3GPP system-fixed broadband access network interworking; Stage 2 (Release 12), V12.2.0 (2015-03). Such integration of a fixed broadband access network may be employed in relation to a 4G/Long-Term Evolution (LTE) based network (e.g. one employing a Control and User Plane Separation or "CUPS" architecture) or a 5G network.

FIGS. 6A-6D are process flow diagrams 600A-600D for describing one example of an end-to-end method to provide secure access to a private network slice of a 5G network for communications, suitable for a secure remote access to a private 5G network of an enterprise. The method may be applied to the system 500 of FIG. 5 described above.

Figure 6A:
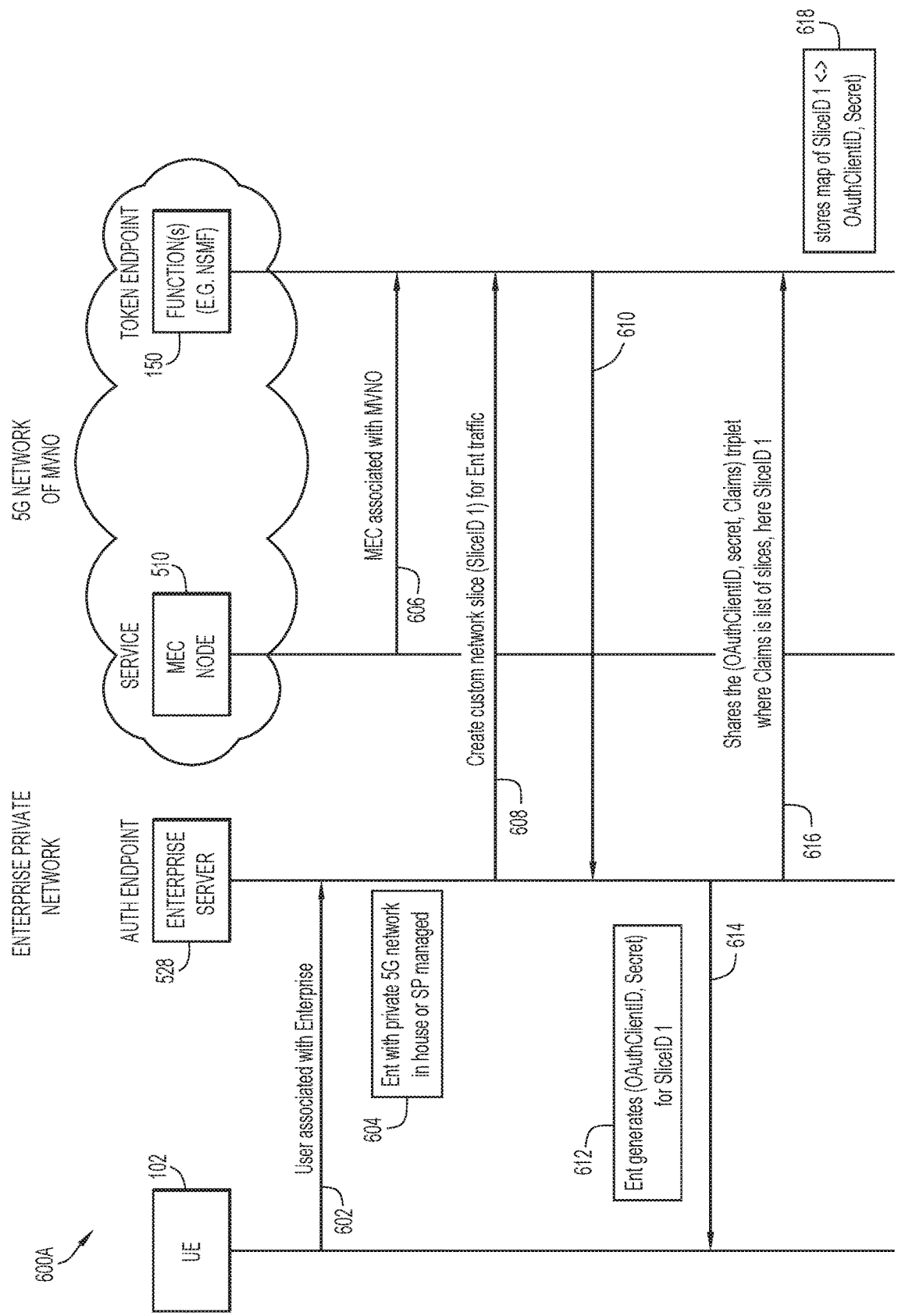
FIGS. 6A-6D are process flow diagrams for describing one example of an end-to-end method for providing a secure access to a private network slice of a 5G network for communications, suitable for a secure remote access to a private 5G network of an enterprise.

Referring to FIG. 6A, a process flow diagram 600A for describing an example of a method for setup and initialization for secure access to a private network slice of a 5G network of a MVNO is shown. In general, UE 102 or the user thereof may be associated with an enterprise private network of an enterprise (step 602 of FIG. 6A). UE 102 may be provided with an application (i.e. an enterprise application) for use with a private 5G network of the enterprise. The private 5G network of the enterprise may be established and managed in-house or by a service provider (SP) (step 604 of FIG. 6A). On the other hand, the MEC or MEC node 510, and/or its associated service for remote access to the private 5G network of the enterprise, may be associated with 5G network of the MNVO (step 606 of FIG. 6A).

In coordination with the MVNO, the enterprise or enterprise server 528 may request and/or participate in the creation of the private network slice for the enterprise in the 5G network of the MNVO (step 608 of FIG. 6A). The private network slice may be associated with a NSI identifier (NSI ID), which may be returned to the enterprise server 528 along with other relevant information (step 610 of FIG. 6A). The enterprise or enterprise server 528 may create credentials, such as a Client ID and Secret (e.g. OAuth 2.0), and associate them with the identity of the private network slice (e.g. the NSI ID) (step 612 of FIG. 6A). The credentials may also be associated with selected, desired enterprise "scopes." The credentials may be shared with UE 102 or its enterprise application (step 614 of FIG. 6A). The credentials, as well as claims to assist in making an authorization decision, may be shared with the MNVO (step 616 of FIG. 6A).

Figure 6B:
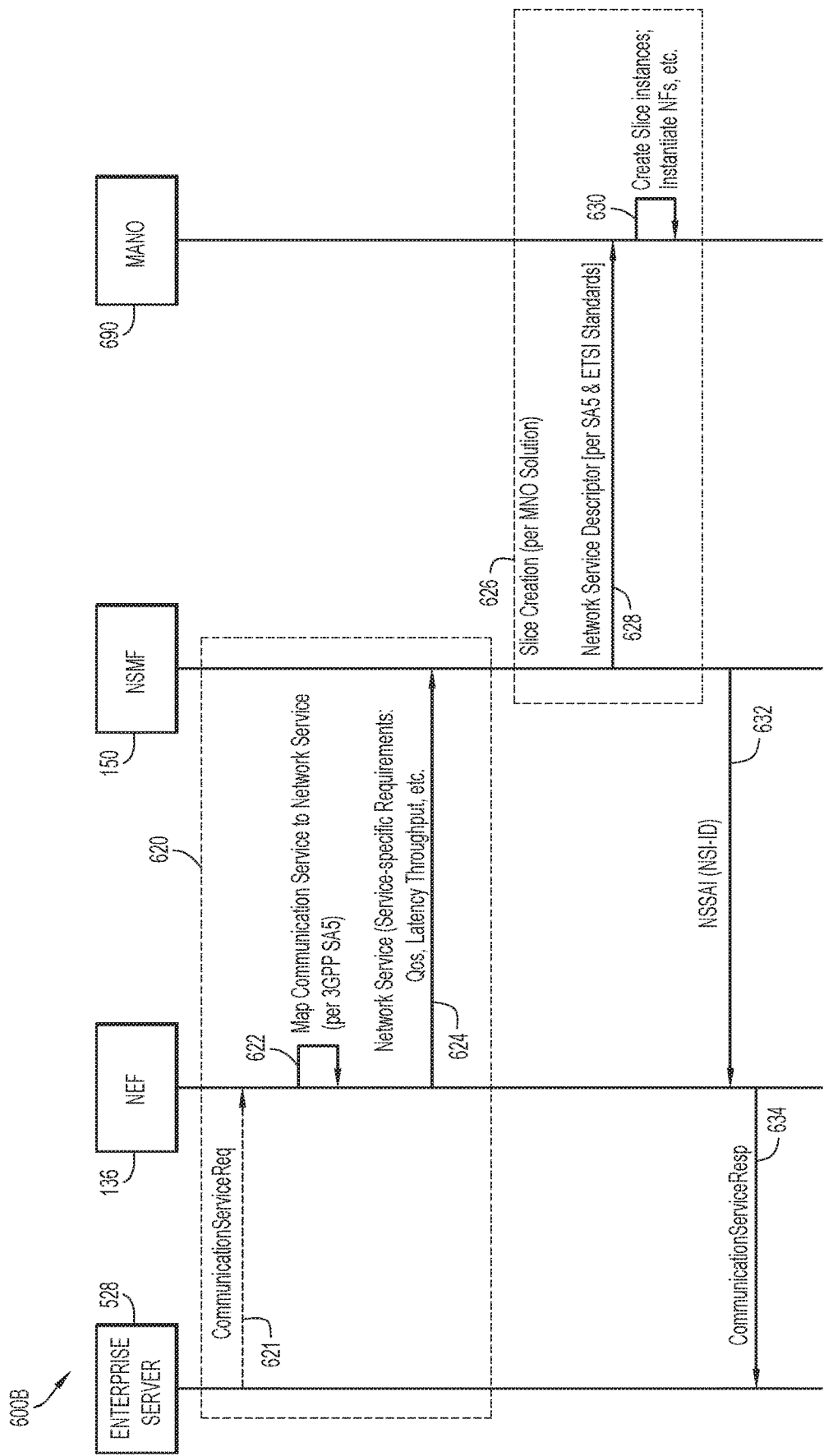

Referring now to FIG. 6B, according to some implementations, enterprise server 528 may request and/or participate in creation of the private network slice for the enterprise according to the process flow diagram 600B. In the present example, NEF 136 may provide an API for enterprise server 528 to request creation of the private network slice for the enterprise. In this implementation, NEF 136 may be configured to operate as a network slice controller, and/or even a communications service management function (CSMF).

In FIG. 6B, the procedure may begin with a process for creating a private network slice or NSI for the enterprise (process 620 of FIG. 6B). Here, NEF 136 may initially receive from enterprise server 528 one or more messages which indicate a request for communication service (step 621 of FIG. 6B). Here, the communication service is associated with the service for remote access to the private 5G network of the enterprise. The one or more messages of step 621 may include or otherwise identify a communication service description associated with the requested communication service. In response, NEF 136 may map the received communication service description to network service requirements of the mobile network (step 622 of FIG. 6B). Here, NEF 136 may derive or select appropriate network service requirements according to the communication service description. In some implementations, the network service requirements may be or include one or more Quality of Service (QoS) parameters, one or more latency parameters, one or more throughput or bandwidth (BW) parameters, etc. In some implementations, step 622 may be performed per the 3GPP "SA5" specification (Service and System Aspects 5=Telecom Management).

Subsequently, NEF 136 may send to NSMF 150 one or more messages which indicate a request for creating an NSI according to the selected network service requirements (step 624 of FIG. 6B). As indicated in FIG. 6B, NSMF 150 may utilize a network functions virtualization management and orchestration (MANO) 690 to assist in creating the NSI. Accordingly, in response to the message of step 624, NSMF 150 together with MANO 690 may create the NSI (step 626 of FIG. 6B). In some implementations, the NSI may be created with MANO 690 according to a specified practice of the MVNO.

In particular, NSMF 150 may send to MANO 690 one or more messages which indicate a request for NSI creation and include a network service descriptor (step 628 of FIG. 6B). This process may be performed according to 3GPP SA5 and/or ETSI standards. Here, MANO 690 may create an NSI and associated NFs according to the network service descriptor (step 630 of FIG. 6B). The created NSI and associated NFs represent the private network slice of the enterprise. Here, network slice selection assistance information (NSSAI) configuration data and an NSI ID associated with the NSI may be generated.

NEF 136 may then receive from NSMF 150 one or more messages which indicate a response to the request for creating the NSI in previous step 624 (step 632 of FIG. 6B). The one or more messages may include the NSSAI configuration data and the NSI ID associated with the NSI and associated NFs. NEF 136 may send to enterprise server 528 one or more messages which indicate a response to the request for communication service of previous step 621 (step 634 of FIG. 6B). The response may include the NSI ID of the NSI representing the private network slice and other relevant information. In turn, enterprise server 528 may receive the response which includes the NSI ID of the NSI representing the private network slice and other relevant information. Enterprise server 528 may associate the NSI ID and other relevant information with the OAuthClientID and Secret, and use the associated information as described above in relation to FIG. 6A (see e.g. steps 610, 612, 614, 616, and 618 of FIG. 6A).

Figure 6C:
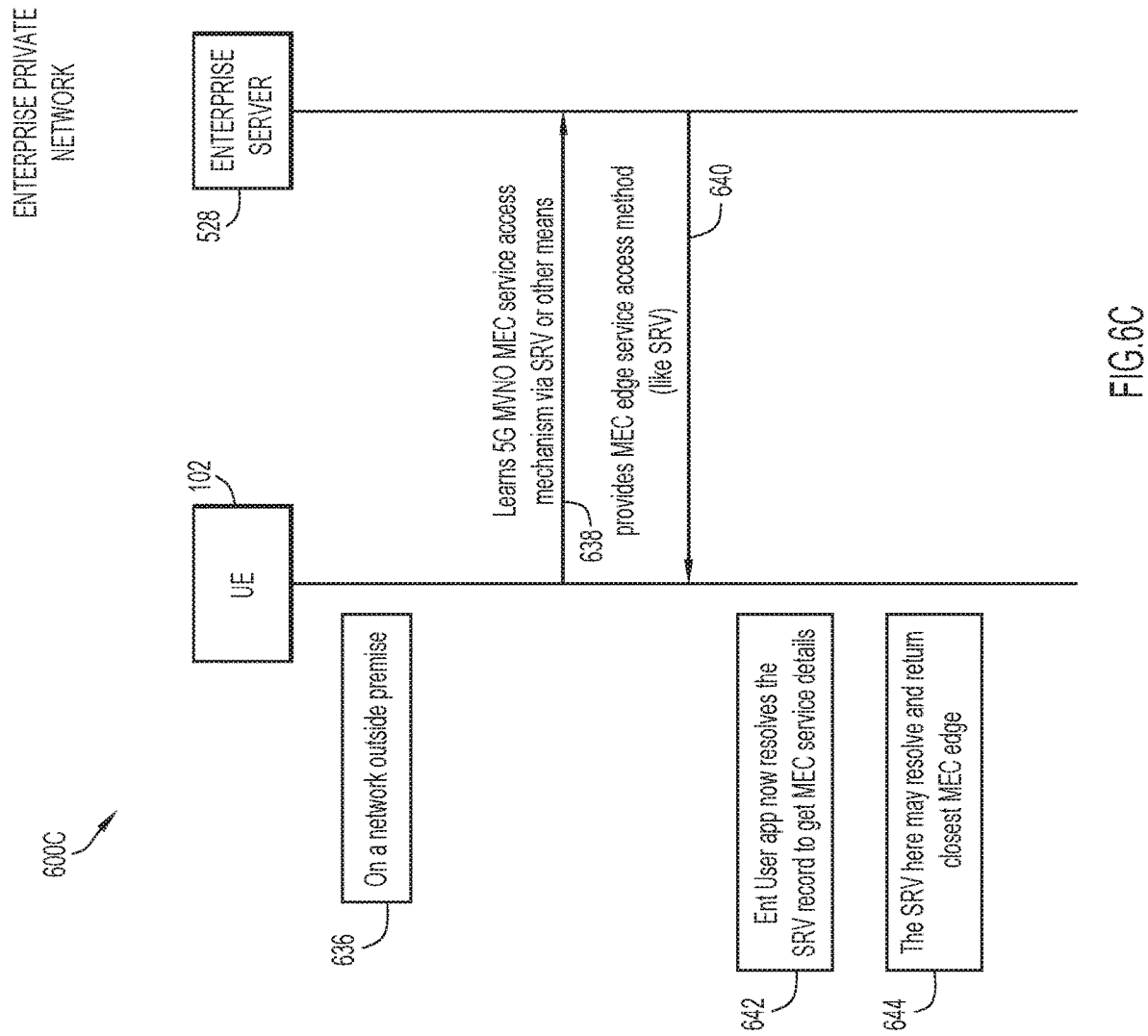

Referring now to FIG. 6C, a process flow diagram 600C for describing an example of a method of discovering a service of an MEC node for secure access to a private network slice of a 5G network of a MVNO is shown. The method of FIG. 6C may directly follow the method described in relation to FIG. 6A and/or 6B. UE 102 is operating in the 5G network outside of the enterprise (at or near a home residence in contrast to the enterprise) (step 636 of FIG. 6C). One or more MECs of the MVNO may provide a service for remote access to the private 5G network of the enterprise. Note that the service may be provided at any suitable MEC node, host, service, or application, and at any suitable MEC location or configuration, such as any of those described earlier in relation to FIGS. 2-4.

UE 102 may send to enterprise server 528 a message indicating a request for service discovery mechanism for locating such an MEC service (step 638 of FIG. 6C). In response, enterprise server 528 may identify or select a service discovery mechanism, and send to UE 102 a message indicating the service discovery mechanism (step 640 of FIG. 6C). Thus, the message may provide UE 102 with an MEC edge service access method. In some implementations, the service discovery mechanism may be a mechanism for service discovery involving a service registry with which service instances may register and deregister.

In preferred implementations, the service discovery mechanism may involve use of SRV ("Service") or SRV-like records. For example, the service of the MEC node may be locatable and located through an SRV record communicated to the UE by the enterprise server. SRV records are (custom) Domain Name System (DNS) resource records that may be used to identify computers that host specific services. The SRV records may be used for establishing connections between a service and a hostname. For example, when an application needs to find a location of a specific service, it may search for a related SRV record. If the application finds one, it proceeds to sift through a list of services and their connecting hostnames, for example, to identify data items which may include a hostname, one or more ports, a priority and weight, and an IP address. In the present method, UE 102 may resolve the SRV record to obtain appropriate MEC service details (step 642 of FIG. 6C). In some implementations, the SRV record may be used to resolve and return the MEC node having the service at a location closest to a location of UE 102 (step 644 of FIG. 6C).

Figure 6D:
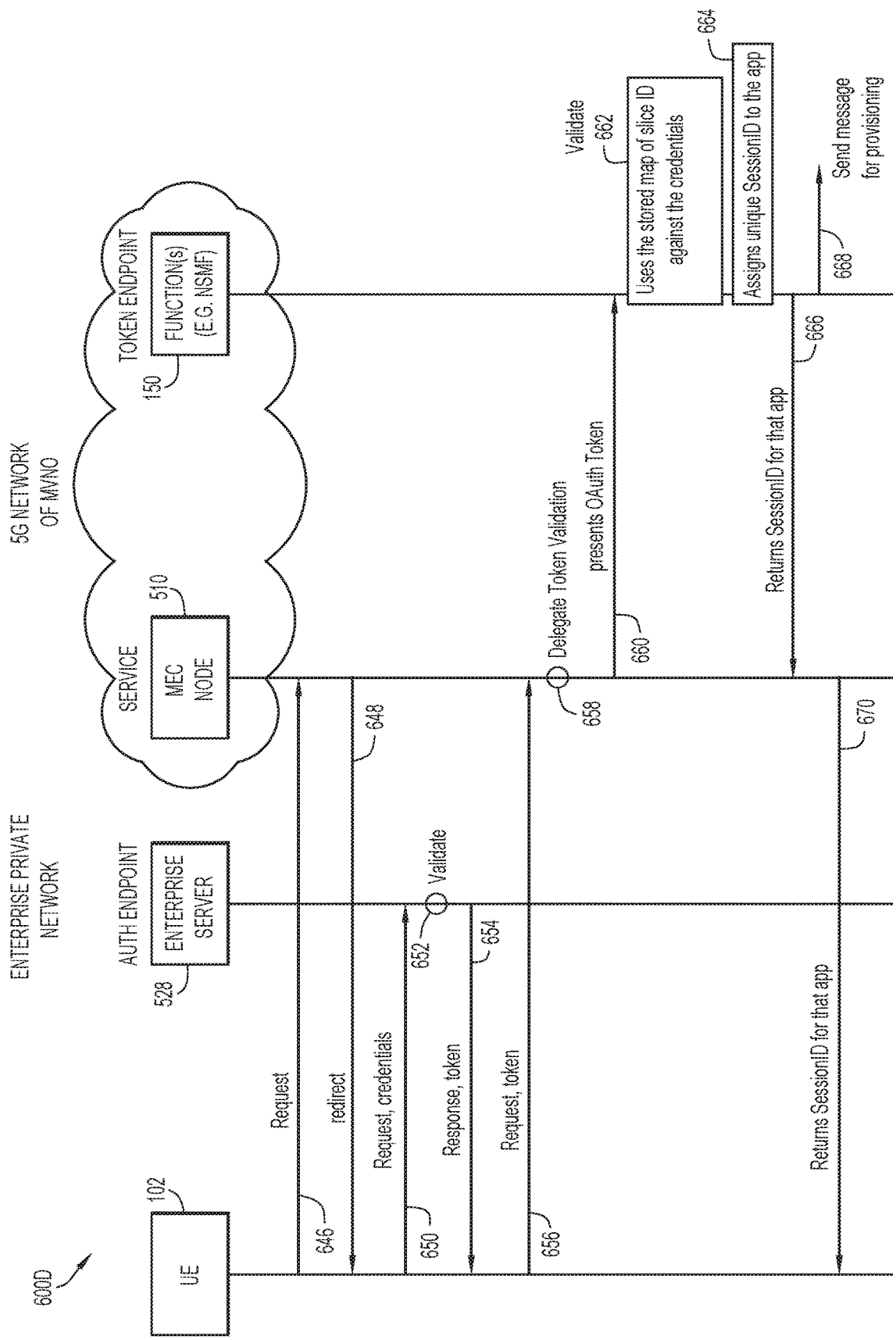

Referring now to FIG. 6D, a process flow diagram 600D for describing an example of a method of providing secure access to a private network slice of a 5G network of a MVNO is shown. The method of FIG. 6D may directly follow the method described in relation to FIG. 6C. UE 102 is operating in the 5G network outside of the enterprise (at or near a home residence in contrast to the enterprise) and has discovered the MEC service for remote access to the private 5G network of the enterprise.

UE 102 may send a message indicating a request for the service (e.g. by invoking the application) (step 646 of FIG. 6D). Here, the message indicating the request of the service may be received by the MEC node 510 having the service. In response, MEC node 510 may return a message to UE 102 for redirecting the request to the enterprise or enterprise server 528 for authorization (step 648 of FIG. 6D). Accordingly, UE 102 may redirect the message to enterprise server 528, and submit credentials to the enterprise server 528 for authentication (step 650 of FIG. 6D). The redirection and submission of credentials may be for an enterprise single-sign on (SSO) procedure of the enterprise.

Enterprise server 528 (e.g. used for enterprise SSO) may receive the redirected request and validate the credentials (step 652 of FIG. 6D). The validation may include a validation that MEC node 510 having the service is a valid resource. Based on a successful validation, enterprise server 528 may send to UE 102 a message indicating a (positive) response to the authentication (step 654 of FIG. 6D). The message may include a token having appropriate claims. In the case where OAuth 2.0 is utilized, the token may be and be referred to as an access token or OAuthToken. In some implementations, the message may include an audience claim which is set to an NSI ID of the private network slice or an indication of the NSI ID. This may ensure that only enterprise-provided tokens intended for the (custom, enterprise) private network slice are allowed.

In some implementations, two or more private network slices are utilized, where two or more NSI IDs are provided to identify two or more NSIs of the enterprise that may be allowed, for reasons such as load balancing or resiliency.

UE 102 may then send to MEC node 510 having the service a message indicating a request for service access which includes the token and claims (step 656 of FIG. 6D). MEC node 510 having the service may identify an indication to delegate token validation to a function in the 5G network, which may be an application, NF or AF (e.g. the NSMF 150, or even the SMF or UPF, etc.) (step 658 of FIG. 6D). Having identified the delegation, MEC node 510 having the service may forward the request to the NSMF 150 (e.g. or other suitable function) (step 660 of FIG. 6D). NSMF 150 may receive the delegated request which includes the token and claims, and perform validation based on the request (step 662 of FIG. 6D). Here, a token validation procedure may be performed.

In some implementations, token validation may be based on prestored credentials received from the enterprise private network or server 528. For example, NSMF 150 may use the stored mapping of the NSI ID against the credentials for token validation. In some implementations, the ClientID may be used to fetch appropriate keying material for token validation. As another example, token validation may be performed by sending, to enterprise server 528, a message indicating a request for validating the token, and receiving, from the enterprise server 528, a message indicating a (positive) response for validation of the token. Validation includes an authorization to use the private network slice identified by the NSI ID.

In response to a successful token validation, NSMF 150 may assign a session identifier or service path identifier to the application or enterprise UP traffic associated with the application (step 664 of FIG. 6D). NSMF 150 may then send to MEC node 510 a message which includes the session identifier or service path identifier (step 666 of FIG. 6D), which is forwarded by the MEC node 510 to UE 102 (step 670 of FIG. 6D). The session identifier or service path identifier may be provided to UE 102 for inclusion in a header of data packets associated with enterprise UP traffic. The session identifier or service path identifier may be inserted by UE 102 in a header which is a Network Service Header (NSH) or the like.

NSMF 150 may also send a message for causing a provisioning of one or more rules in a forwarding entity (e.g. forwarding entity 512 of FIG. 5) in the mobile network (step 668 of FIG. 6D). The provisioning of the one or more rules in the forwarding entity may be for causing enterprise UP traffic of the UE 102 to be forwarded to an anchor UPF of the private network slice of the enterprise. The one or rules may be or include traffic forwarding rules and the like. The forwarding entity which is provisioned may be or include a router, a gateway, a classifier, a branching point, a Branching Point UPF, or an UL-CL, or any combination of the above. The forwarding entity may be located at the MEC. The session identifier or service path identifier to may be sent in a message for provisioning the forwarding entity, for causing the enterprise UP traffic of UE 102 to be forwarded to the anchor UPF as described. In additional or alternative implementations, NSMF 150 may cause one or more values of a 5-tuple for the enterprise UP traffic to be provisioned in the forwarding entity for causing the UP traffic of the UE to be forwarded to the anchor UPF as described.

Again, in some implementations where UE 102 operates remotely in a home network at the user's residence, for example, in a fixed broadband access network, a network architecture involving a fixed broadband access network-mobile network integration for integrating fixed broadband access networks and mobile networks may be utilized. Here, the BNG or BRAS may connect to an ePDG which connects to a Branching Point UPF, and this Branching Point UPF may be provisioned to forward and route the enterprise UP traffic toward and to the anchor UPF in the private network slice.

With reference back to FIG. 5, again, the enterprise UP traffic of UE 102 may be forwarded and routed toward and to anchor UPF 540 in "Slice 1" along the path 530 to the private 5G network 522 of the factory, whereas the subscriber UP traffic of UE 102 may be forwarded and routed in "Slice 2" along the path 532 to the Internet 520 or other network. The enterprise UP traffic communication may be used for remote control and/or monitoring of elements in the private 5G network 522 of the factory.

Figure 7:
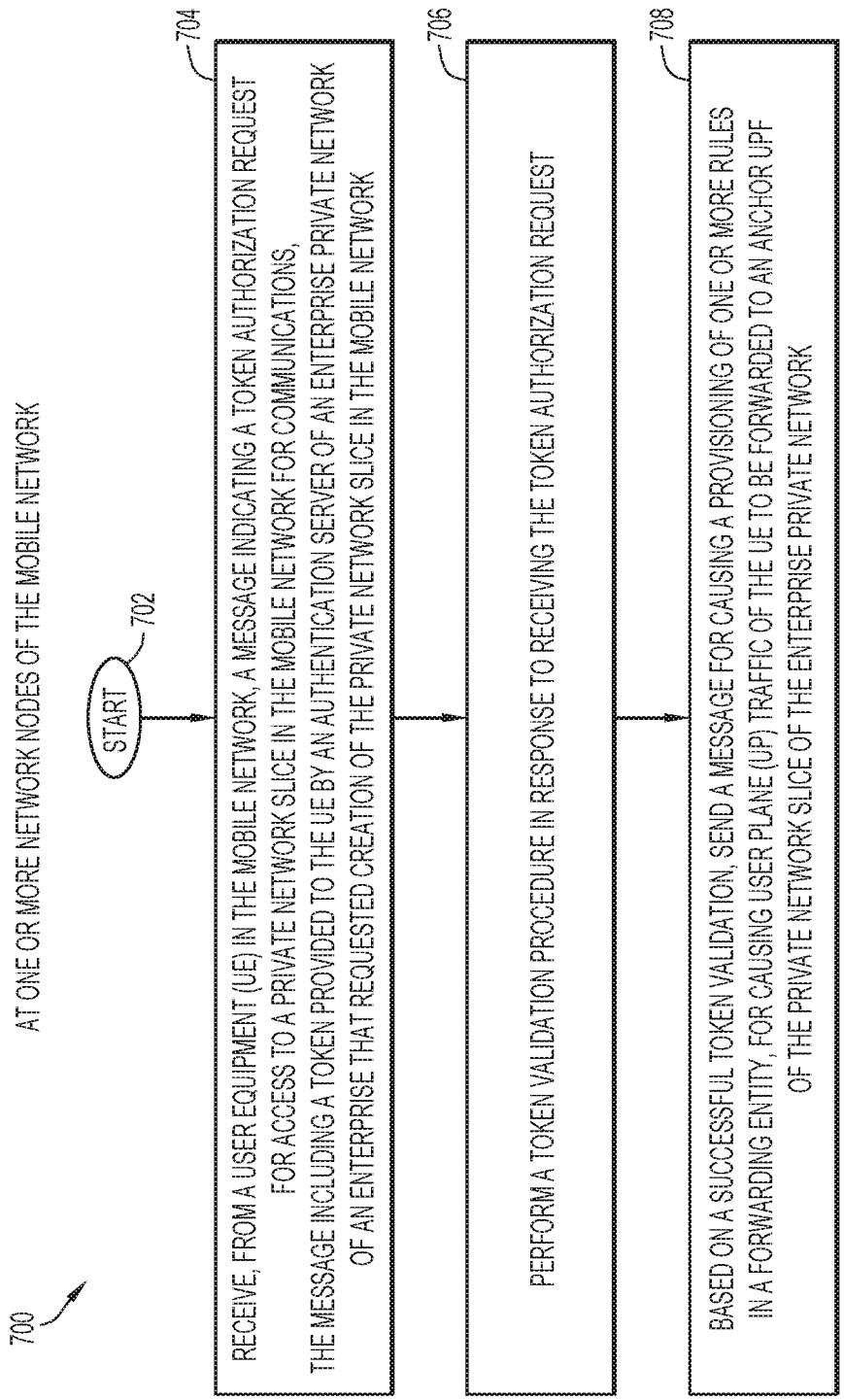
FIG. 7 is a flowchart for describing a method for a secure access to use of a private network slice of the 5G network for communications, suitable for a secure remote access to a private 5G network of an enterprise, according to some implementations of the present disclosure.

FIG. 7 is a flowchart 700 for describing a method for secure access to a private network slice of a mobile network (e.g. 5G network) of an MVNO for communications, suitable for a secure remote access to a private network (e.g. a private 5G network) of an enterprise. The method may be performed by one or more network nodes of the mobile network (e.g. 5G network), where a network node may include a function such as an NF or AF which performs the method. A network node may include one or more processors and one or more network interfaces, where the one or more processors are configured to perform the steps of the method. The method may be embodied as a computer program product which includes a non-transitory computer readable medium and computer instructions stored in the non-transitory computer readable medium, where the computer instructions are executed by one or more processors of the network node of the mobile network.

Note that the method of FIG. 7 may make use of an authorization or delegation protocol to provide the secure access. Here, an enterprise server (e.g. authentication server) of an enterprise private network of an enterprise may serve as an authorization endpoint of the authorization or delegation protocol, and the one or more network nodes of the mobile network (e.g. a function such as an application, AF, or NF such as an NSMF) may serve as a token endpoint of the authorization or delegation protocol. In some implementations, the authorization or delegation protocol may accord to or be compatible with an OAuth2.0 protocol.

Beginning at a start block 702 of FIG. 7, the network node may receive, from a UE in the mobile network, a message indicating a token authorization request for access to the private network slice of the mobile network for communications (step 704 of FIG. 7). The message indicating the token authorization request may have been forwarded via a MEC node that provides a service to the UE for accessing the private network slice for communications, for a secure remote access to a private 5G network of an enterprise of the UE.

In step 704, the message indicating the token authorization request may include a token provided to the UE by the authentication server of the enterprise private network of the enterprise. The enterprise may be the enterprise that requested and/or participated in the creation of the private network slice of the mobile network. The token may have been provided to the UE based on validated credentials of the UE (i.e. validated by the authentication server of the enterprise). The message indicating the token authorization request may further include a claim which includes a network slice identifier, or NSI ID, of the private network slice or an indication representing the NSI ID.

The network node may perform a token validation procedure in response to receiving the token authorization request (step 706 of FIG. 7). In some implementations, token validation of the token may be based on a validation of prestored credentials received from the enterprise private network (e.g. received when the enterprise requested creation of and/or created the private network slice). In other implementations, the token validation procedure may involve sending, to the authentication server of the enterprise private network, a message indicating a request for validating the token, and then receiving, from the authentication server, a message indicating a (e.g. positive) response for validation of the token.

Based on a successful token validation, the network node may allow UE 102 access to the private network slice identified by the NSI ID, for a secure remote access to the private 5G network of the enterprise. The private network slice may be associated with functions which include at least a UPF, an SMF, and a PCF. Here, the network node may send a message for causing a provisioning of one or more rules in a forwarding entity in the mobile network (step 708 of FIG.

7). The provisioning of the one or more rules in the forwarding entity may be for causing enterprise UP traffic of the UE to be forwarded to an anchor UPF of the private network slice of the enterprise. Using the private network slice, the enterprise UP traffic may be forwarded to the private 5G network of the enterprise. The enterprise UP traffic communication may be used for the remote control and/or monitoring of elements in the private 5G network of the enterprise. The forwarding entity may be or include a router, a gateway, a classifier, a branching point, a Branching Point UPF, or UL-CL, or any combination of the above.

In some implementations, the network node may cause one or more values of a 5-tuple for the enterprise UP traffic to be provisioned in the forwarding entity for causing the UP traffic of the UE to be forwarded to the anchor UPF as described. In additional or alternative implementations, the network node may cause the session identifier or service path identifier to be provisioned in the forwarding entity for causing the UP traffic of the UE to be forwarded to the anchor UPF as described. Here, the network node may send to the UE a message which includes a session identifier or service path identifier. The session identifier or service path identifier may be provided to the UE for inclusion in a header of data packets associated with the UP traffic. The session identifier or service path identifier may be inserted by the UE in a header which is a NSH or the like.

Thus, traffic splitting functionality is made available in order to route enterprise UP traffic from the UE using a private network slice while routing remaining subscriber UP traffic from the same UE using a subscriber network slice of the subscriber. Such a mechanism may be considered or viewed as a Split VPN, where enterprise UP traffic is routed through a secure tunnel to the enterprise while remaining subscriber UP traffic is routed to the Internet or other public network.

Figure 8:
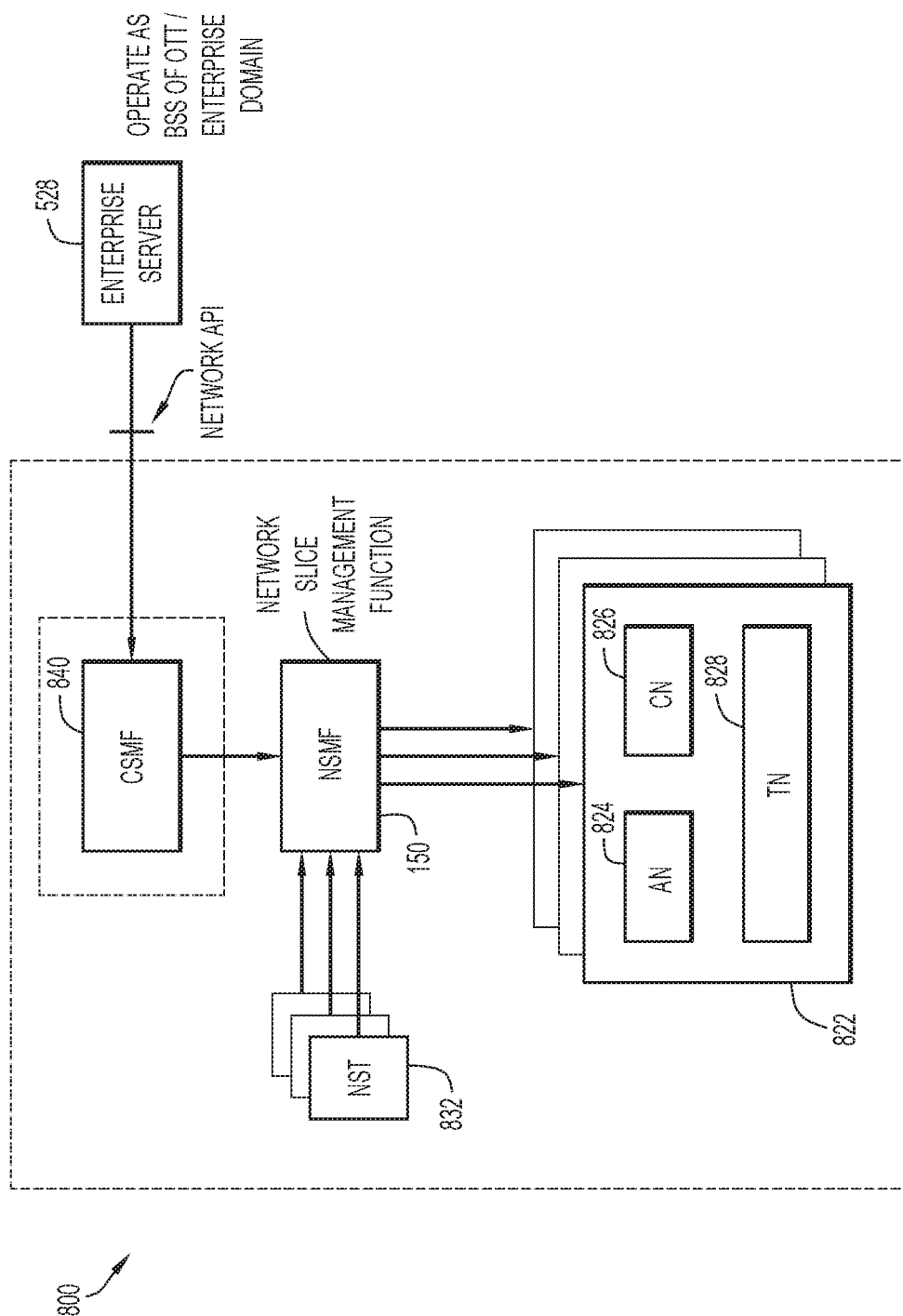
FIG. 8 is an illustrative representation of a system for use in network slice creation according to some implementations.

Referring now to FIG. 8, an illustrative representation of a system 800 for use in network slice creation according to some implementations is shown. Such a system 800 may be used in requesting and/or creating a private network slice in a 5G network for an enterprise. In general, an NSI is the instantiation of a network slice. A network slice may be considered to be a logical network which includes a set of network functions. The set of network functions may be VNFs or Physical Network Functions (PNFs), as well as corresponding resources such as compute, storage, and networking resources. A network slice may be considered to be "sliced out" from the "physical" network in order to provide specific capabilities and characteristics that an application running within the slice requires. Specific capability and characteristics may be or include customized connectivity with ultra-low latency, extreme reliability, and/or value-added services, as necessary and/or configured. A network slice may also be viewed as a unique profile for an application, defined as a set of services within the network, or as a network function chain built to support a given use case, traffic type or a customer.

In FIG. 8, system 800 may include a CSMF 840 in communication with NSMF 150. In some implementations, enterprise server 528 may utilize a network API (e.g. REST) with the NEF of the 5G network. Enterprise server 528 may send to CSMF 840 of the NEF a communication service description according to a communication service request. CSMF 840 may receive the communication service description and select network service requirements according to such description. CSMF 840 of the NEF may translate the selected network service requirements into slice-specific requirements. CSMF 840 may send the slice-specific requirements to NSMF 150. At NSMF 150, a selected one of a plurality of network slice templates (NSTs) 832 may be used to create NSI 822 according to the slice-specific requirements. The selected NST 832 may provide the NSI 822 with required instance specific policies and configurations. The NSI 822 may include associated NFs, such as an access network (AN) function 824, a CN function 826, and a transport network (TN) function 828.

Figure 9:
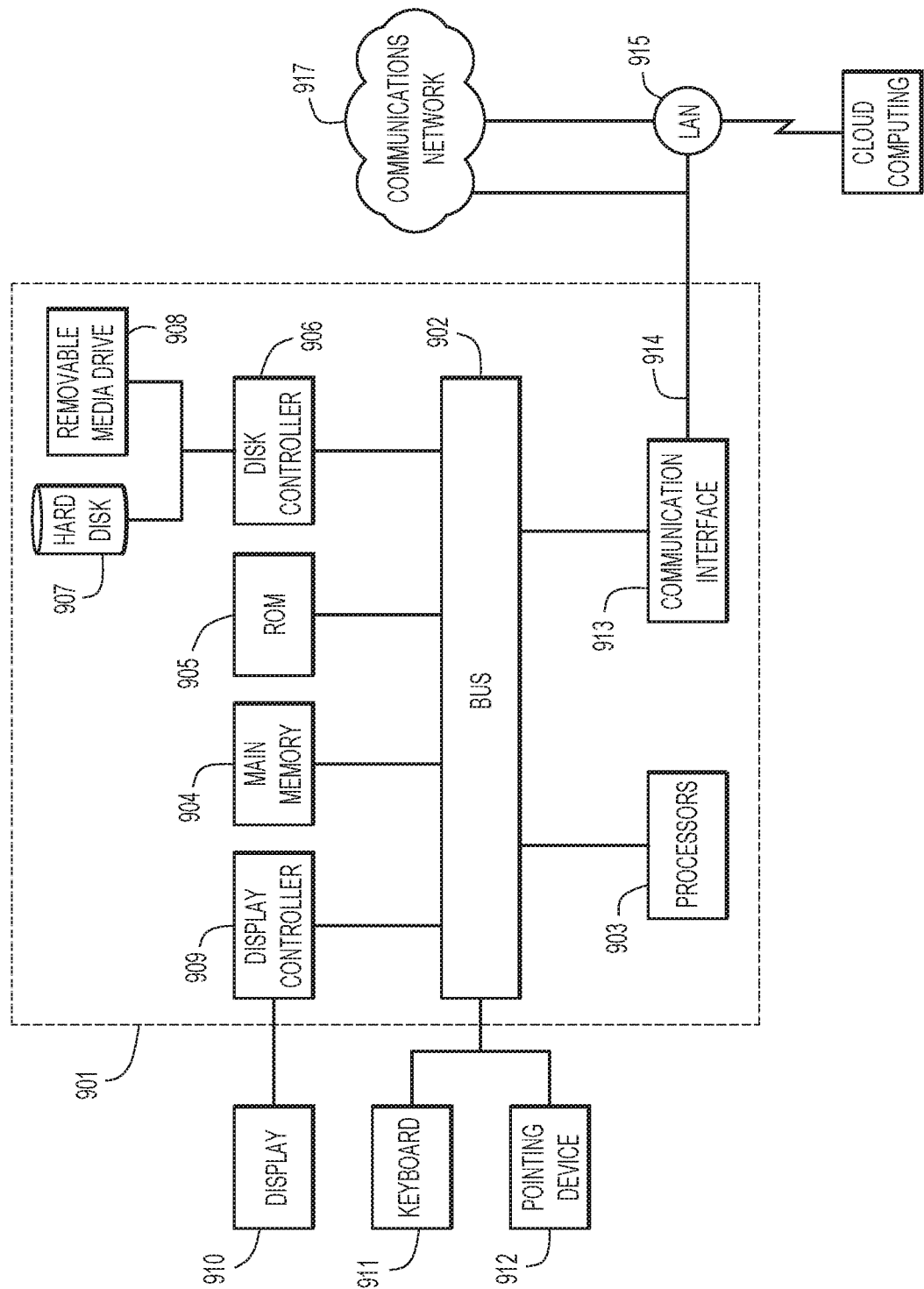
FIG. 9 is a block diagram of a network node, such as a server (e.g. an enterprise server of an enterprise private network), according to some implementations.

FIG. 9 is a block diagram of a network node, such as a server, according to some implementations of the present disclosure. Such a network node or server may be provided for use in an enterprise private network according to some implementations (e.g. as enterprise server 528 of enterprise private network of FIGS. 5 and 6A-6D). In some implementations, the network node or server may comprise a computer system 901 which may include one or more processors 903 coupled to a bus 902 or other information communication mechanism. The one or more processors 903 may be configured to process information which may be communicated over bus 902. While FIG. 9 shows a single block for processor 903, processors 903 may in actual practice represent a plurality of processing cores, each of which may perform separate processing.

Computer system 901 may also include a main memory 904, such as a random access memory (RAM) or other dynamic storage device (e.g. a dynamic RAM or "DRAM"), a static RAM or "SRAM", and a synchronous DRAM or "SDRAM"), coupled to the bus 902 for storing information and instructions to be executed by processor 903. The main memory 904 may be used for storing temporary variables or other intermediate information during the execution of instructions by the processor 903. Computer system 901 may further include a read only memory (ROM) 905 or other static storage device (e.g. a programmable ROM or "PROM", an erasable PROM or "EPROM", and an electrically erasable PROM or "EEPROM") coupled to the bus 902 for storing static information and instructions for the processor 903.

Computer system 901 may also include a disk controller 906 coupled to the bus 902 to control one or more storage devices for storing information and instructions, such as a magnetic hard disk 907, and a removable media drive 908 (e.g. floppy disk drive, read-only compact disc drive, read/write compact disc drive, compact disc jukebox, tape drive, and removable magneto-optical drive). The storage devices may be added to the computer system 901 using an appropriate device interface (e.g. a small computer system interface or "SCSI", an integrated device electronics or "IDE", an enhanced-IDE or "E-IDE", a direct memory access or "DMA", or an ultra-DMA).

Computer system 901 may also include special purpose logic devices (e.g. application specific integrated circuits or "ASICs") or configurable logic devices (e.g. simple programmable logic devices or "SPLDs," complex programmable logic devices or "CPLDs," and field programmable gate arrays or "FPGAs"), that, in addition to microprocessors and digital signal processors may individually, or collectively, are types of processing circuitry. The processing circuitry may be located in one device or distributed across multiple devices.

Computer system 901 may also include a display controller 909 coupled to the bus 902 to control a display 910, such as a cathode ray tube (CRT), for displaying information to a computer user. Computer system 901 includes input devices, such as a keyboard 911 and a pointing device 912, for interacting with a computer user and providing information to the processor 903. The pointing device 912, for example, may be a mouse, a trackball, or a pointing stick for communicating direction information and command selections to the processor 903 and for controlling cursor movement on the display 910.

Computer system 901 performs a portion or all of the processing steps of the process in response to the processor 903 executing one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, computer system 901 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g. CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 901, for driving a device or devices for implementing the process, and for enabling the computer system 901 to interact with a human user (e.g. print production personnel). Such software may include, but is not limited to, device drivers, operating systems, development tools, and applications software. Such computer readable storage media may further include a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

Computer system 901 also includes a communication interface 913 coupled to the bus 902. The communication interface 913 provides a two-way data communication coupling to a network link 914 that is connected to, for example, a local area network (LAN) 915, or to another communications network 917 such as the Internet. For example, the communication interface 913 may be a wired or wireless network interface card to attach to any packet switched (wired or wireless) LAN. As another example, the communication interface 913 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through LAN 915 or through equipment operated by a service provider, which provides communication services through a communications network 917. The LAN 915 and the communications network 917 use, for example, electrical, electromagnetic, or optical signals that carry digital data streams, and the associated physical layer (e.g. CAT 5 cable, coaxial cable, optical fiber, etc.). The signals through the various networks and the signals on the network link 914 and through the communication interface 913, which carry the digital data to and from the computer system 901 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 901 can transmit and receive data, including program code, through the network(s) 915, the network link 914 and the communication interface 913. Moreover, the network link 914 may provide a connection through LAN 915 to a cloud computing network or the like.

Figure 10:
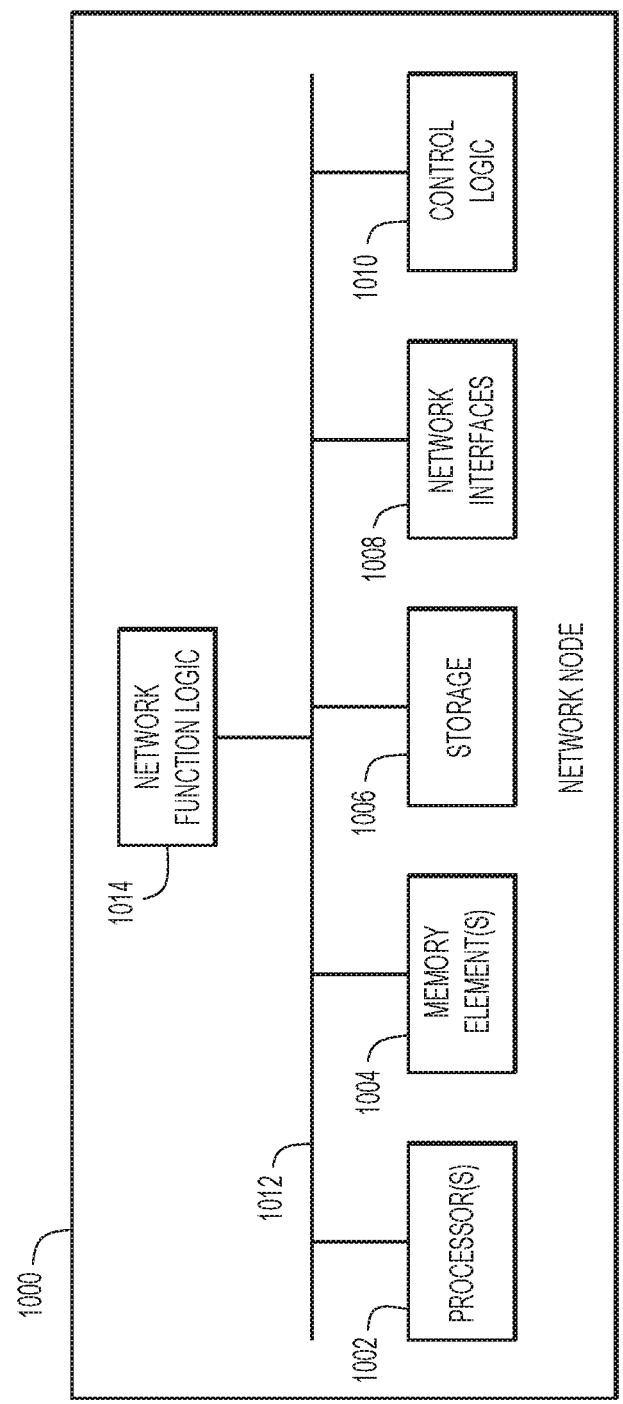
FIG. 10 illustrates a block diagram of a network node for a network function (NF) of a 5G network configured to perform operations according to some implementations.

FIG. 10 is a simplified block diagram illustrating example details that can be associated with a network node 1000 (network equipment, a compute or computing node) for an NF, in accordance with some implementations described herein. In various embodiments, network element functionality may be performed using any combination of network nodes. In various embodiments, network node 1000 can be implemented as, for example, a data center network node such as a server, rack of servers, multiple racks of servers, etc., for a data center; or a cloud network node, which may be distributed across one or more data centers.

In some implementations, network node 1000 can include can include one or more processors 1002, one or more memory elements 1004, storage 1006, network interfaces 1008, control logic 1010 and network function logic 1014. In some implementations, the processors 1002 are at least one hardware processor configured to execute various tasks, operations and/or functions for network node 1000 as described herein according to software and/or instructions configured for the network node 1000. In some implementations, memory elements 1004 and/or storage 1006 are configured to store data, information, software, instructions, logic (e.g. any logic 1010 and/or 1014), data structures, combinations thereof, or the like for various embodiments described herein. Note that in some implementations, storage can be consolidated with memory elements (or vice versa), or can overlap/exist in any other suitable manner.

In some implementations, network interfaces 1008 enable communication between for network node 1000 and other network elements, systems, slices, etc. that may be present in the system to facilitate operations as discussed for various embodiments described herein. In some implementations, network interfaces 1008 can include one or more Ethernet drivers and/or controllers, Fiber Channel drivers, and/or controllers, or other similar network interface drivers and/or controllers to enable communications for network node 1000 within the system.

In some implementations, control logic 1010 can include instructions that, when executed (e.g. via processors 1002), cause for network node 1000 to perform operations, which can include, but not be limited to, providing overall control operations of network node 1000; cooperating with other logic, data structures, etc. provisioned for and/or maintained by network node 1000; combinations thereof; or the like to facilitate various operations as discussed for various embodiments described herein.

In some implementations, bus 1012 can be configured as an interface that enables one or more elements of network node 1000 (e.g. processors 1002, memory elements 1004, logic, etc.) to communicate in order to exchange information and/or data. In at least one embodiment, bus 1012 may be implemented as a fast kernel-hosted interconnect, potentially using shared memory between processes (e.g. logic, etc.), which can enable efficient communication paths between the processes.

In some implementations, network function logic 1014 can include instructions that, when executed (e.g. via one or more processors 1002) cause network node 1000 to perform one or more operations for one or more network elements as discussed for various implementations described herein.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

The terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

In some implementations, a system or network may represent a series of points or nodes of interconnected communication paths (wired or wireless) for receiving and transmitting packets of information that propagate through the network. In some implementations, a network may be associated with and/or provided by a single network operator or service provider and/or multiple network operators or service providers. In various embodiments, the network may include and/or overlap with, in whole or in part, one or more packet data network(s) (e.g. one or more packet data networks). A network may offer communicative interfaces between various elements and may be further associated with any LAN, wireless local area network (WLAN), metropolitan area network (MAN), wide area network (WAN), VPN, RAN, virtual local area network (VLAN), enterprise network, Intranet, extranet, Low Power Wide Area Network (LPWAN), Low Power Network (LPN), Machine to Machine (M2M) network, IoT Network, or any other appropriate architecture or system that facilitates communications in a network environment.

Note that the terms 'UE', 'mobile device,' 'mobile radio device,' 'end device', 'user', 'subscriber' or variations thereof may be used interchangeably and are inclusive of devices used to communicate, such as a computer, an electronic device such as an IoT device (e.g. an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A UE may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in digital signal processing (DSP) instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory elements and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more the elements identified herein could be some type of a programmable processor, programmable digital logic (e.g. a FPGA, a DSP processor, an EPROM, a controller, an EEPROM, or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and may accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first message could be termed a second message, and similarly, a second message could be termed a first message, without changing the meaning of the description, so long as all occurrences of the "first message" are renamed consistently and all occurrences of the "second message" are renamed consistently. The first message and the second message are both messages, but they are not the same message.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at one or more network nodes of a mobile network,
      receiving, from a user equipment (UE) in the mobile network, a message indicating a token authorization request for access to a private network slice of an enterprise for communications, the message including a token provided to the UE by an enterprise server of an enterprise private network of the enterprise, the token having a claim which is set to a network slice identifier of the private network slice or an indication representing the network slice identifier;
      performing a token validation procedure in response to the token authorization request, the token validation procedure being performed based on the token having the claim and stored credentials that are mapped to the network slice identifier that is set or indicated in the claim; and
      based on a successful token validation of the token having the claim, sending a message for causing a provisioning of one or more rules in a forwarding entity, for causing user plane (UP) traffic of the UE to be forwarded to an anchor user plane function (UPF) of the private network slice.

2. The method of claim 1, wherein the token is provided to the UE by the enterprise server of the enterprise private network based on validated credentials of the UE, the enterprise server comprising an authentication server.

3. The method of claim 1, wherein the message indicating the token authorization request is forwarded via a multi-access edge computing (MEC) node having a service for accessing use of the private network slice.

4. The method of claim 1, wherein the one or more network nodes serve as a token endpoint in an authorization or delegation protocol, operative in connection with the enterprise server of the enterprise private network which serves as an authorization endpoint in the authorization or delegation protocol, and wherein the stored credentials are for use in the authorization or delegation protocol.

5. The method of claim 1, wherein the forwarding entity comprises one of a router, a gateway, a classifier, a branching point, a Branching Point UPF, or an Uplink (UL) Classifier (UL-CL).

6. The method of claim 4, wherein performing the token validation procedure further comprises:
   sending, to the enterprise server of the enterprise private network, a message indicating a request for validating the token; and
   receiving, from the enterprise server of the enterprise private network, a message indicating a response for validation of the token.

7. The method of claim 1, wherein the claim which is set to the network slice identifier of the private network slice or the indication representing the network slice identifier further comprises a claim which is set to a network slice instance (NSI) identifier (ID) of the private network slice or an indication representing the NSI ID.

8. The method of claim 1, further comprising:
   based on the successful token validation of the token having the claim, sending to the UE a message which includes a session identifier or service path identifier, for inclusion in a header of data packets associated with the UP traffic for causing the UP traffic of the UE to be forwarded to the anchor UPF.

9. The method of claim 1, wherein sending the message for causing the provisioning of one or more rules in the forwarding entity further comprises:
causing the provisioning of the one or more rules in the forwarding entity with one or more values of a 5-tuple for the UP traffic of the UE.

10. The method of claim 1, further comprising:
based on the successful token validation of the token having the claim, providing the UE with access to and use of the private network slice in the mobile network, for a secure remote access to a private 5G network of the enterprise via the anchor UPF of the private network slice.

11. The method of claim 1, wherein:
the message indicating the token authorization request is forwarded via a multi-access edge computing (MEC) node which provides a service for accessing use of the private network slice, the service being locatable through a Service (SRV) record communicated to the UE by the enterprise server.

12. The method of claim 1, further comprising:
after the private network slice is created in the mobile network via a request from the enterprise private network:
receiving, from the enterprise private network, the network slice identifier of the private network slice and the stored credentials which include a client identifier (ID) and a secret; and
mapping the stored credentials and the network slice identifier.

13. A network node for use in a mobile network, the network node comprising:
one or more processors;
one or more network interfaces;
the one or more processors being configured to:
receive, from a user equipment (UE) in the mobile network, a message indicating a token authorization request for access to a private network slice in the mobile network for communications, the message including a token provided to the UE by an enterprise server of an enterprise private network that requested creation of the private network slice of the mobile network, the token having a claim which is set to a network slice identifier of the private network slice or an indication representing the network slice identifier;
perform a token validation procedure in response to the token authorization request, the token validation procedure being performed based on the token having the claim and stored credentials that are mapped to the network slice identifier that is set or indicated in the claim; and
based on a successful token validation of the token having the claim, send a message for causing a provisioning of one or more rules in a forwarding entity, for causing user plane (UP) traffic of the UE to be forwarded to an anchor user plane function (UPF) of the private network slice.

14. The network node of claim 13, wherein the one or more processors are further configured to, based on the successful token validation of the token having the claim, send to the UE a message which includes a session identifier or service path identifier, for inclusion in a header of data packets associated with the UP traffic for causing the UP traffic of the UE to be forwarded to the anchor UPF of the private network slice.

15. The network node of claim 13, wherein the one or more processors are further configured to receive the message indicating the token authorization request that is forwarded via a multi-access edge computing (MEC) node which provides a service for accessing use of the private network slice, the service being locatable through a Service (SRV) record communicated to the UE by the enterprise server.

16. The network node of claim 13, which serves as a token endpoint in an authorization or delegation protocol, and is operative in connection with the enterprise server of the enterprise private network which serves as an authorization endpoint in the authorization or delegation protocol, and wherein the stored credentials are for use in the authorization or delegation protocol.

17. The network node of claim 16, wherein the one or more processors are further configured to:
after the private network slice is created in the mobile network via a request from the enterprise private network:
receive, from the enterprise private network, the network slice identifier of the private network slice and the stored credentials which include a client identifier (ID) and a secret; and
map the stored credentials and the network slice identifier.

18. The network node of claim 13, wherein the one or more processors are further configured to, based on the successful token validation of the token having the claim, provide the UE with access to and use of the private network slice in the mobile network, for a secure remote access to a private 5G network of the enterprise via the anchor UPF of the private network slice.

19. A computer program product, comprising:
a non-transitory computer readable medium;
computer instructions stored in the non-transitory computer readable medium;
the computer instructions being executable by one or more processors of a network node of a mobile network for:
receiving, from a user equipment (UE) in the mobile network, a message indicating a token authorization request for access to a private network slice of an enterprise for communications, the message including a token provided to the UE by an enterprise server of an enterprise private network of the enterprise, the token having a claim which is set to a network slice identifier of the private network slice or an indication representing the network slice identifier;
performing a token validation procedure in response to the token authorization request, the token validation procedure being performed based on the token having the claim and stored credentials that are mapped to the network slice identifier that is set or indicated in the claim; and
based on a successful token validation of the token having the claim, sending a message for causing a provisioning of one or more rules in a forwarding entity, for causing user plane (UP) traffic of the UE to be forwarded to an anchor user plane function (UPF) of the private network slice.

20. The computer program product of claim 19, wherein the computer instructions are further executable by the one or more processors of the network node for, based on the successful token validation of the token having the claim, providing the UE with access to and use of the private network slice in the mobile network, for a secure remote access to a private 5G network of the enterprise via the anchor UPF of the private network slice.

* * * * *